United States Patent [19]
Bottman

[11] Patent Number: 5,532,603
[45] Date of Patent: Jul. 2, 1996

[54] CROSS-TALK MEASUREMENT APPARATUS WITH NEAR-END COMPENSATION

[75] Inventor: Jeffrey S. Bottman, Seattle, Wash.

[73] Assignee: Fluke Corporation, Everett, Wash.

[21] Appl. No.: 379,230

[22] Filed: Jan. 27, 1995

[51] Int. Cl.⁶ .................................................. G01R 27/04
[52] U.S. Cl. ............................................ 324/628; 364/483
[58] Field of Search ................................. 324/628, 603; 364/483; 379/6, 21, 27, 1, 32, 34

[56] References Cited

U.S. PATENT DOCUMENTS

| | | | |
|---|---|---|---|
| 3,745,266 | 7/1973 | Niedereder | 324/628 |
| 4,290,010 | 9/1981 | Blaess et al. | 324/628 |
| 4,977,376 | 12/1990 | Schiek et al. | 324/628 |
| 5,063,351 | 11/1991 | Goldthorp | 324/628 |
| 5,185,735 | 2/1993 | Ernst | 324/628 |

OTHER PUBLICATIONS

"A Time Domain Crosstalk Test For Cables" Brooks et al. International Wire & Cable Symposium (13–15 Nov. 1979).

*Primary Examiner*—Maura K. Regan

[57] ABSTRACT

A pulse-based cable crosstalk measurement instrument provides near-end cross talk (NEXT) information for characterizing the performance of local area network (LAN) cable systems. Accuracy of the cross-talk measurement is enhanced by measuring and mathematically removing the cross-talk effects of the near-end connector. Accuracy of the cross-talk measurement is further enhanced by conducting the cross-talk measurement with pulses of differing pulse widths selected to have increased pulse energy in frequency ranges of interest. A composite cross-talk response using the individual cross-talk responses of the individual pulse widths concatenated together is created and then compared with an industry-standard pass fail limit to provide a pass-fail decision on a LAN cable test system under test.

25 Claims, 16 Drawing Sheets

CROSS-TALK MEASUREMENT APPARATUS WITH NEAR-END COMPENSATION

CROSS REFERENCE TO RELATED APPLICATION

This application is related to pending U.S. patent application Ser. No. 08/220,068 filed Mar. 30, 1994, entitled "Cable Crosstalk Measurement System."

BACKGROUND OF THE INVENTION

This invention relates generally to electrical cable testing and troubleshooting, and in particular to measuring the cross-talk characteristics of local area network cables.

Local area networks (LAN's) now connect a vast number of personal computers, workstations, printers, and file servers in the modern office. A LAN system is typically implemented by physically connecting all of these devices with copper-conductor twisted-wire pair ("twisted-pair") LAN cables, the most common being an unshielded twisted-pair (type "UTP") LAN cable which is 8-wire cable which is configured as 4 twisted-pairs. Each of the four twisted-pairs function as a transmission line which conveys a data signal through the LAN cable. Each end of the LAN cable is terminated in an industry-standard connector, the most common being the type "RJ-45" connector. In a typical installation, LAN cables may be routed through walls, floors, and ceilings of the building. LAN cable systems require constant maintenance, upgrades, and troubleshooting because LAN cables and connectors are subject to breakage, offices and equipment must be moved, and new equipment is added.

The tasks of installing, replacing, or re-routing cables typically fall on a professional cable installer or in-house network specialist. During the installation phase, each cable is routed through the building and a connector is attached to each end of the new cable. Each wire in the cable must be connected to its proper respective electrical connection on both ends of the cable in order for the LAN connection to function. A LAN cable system that has been improperly installed, or has faulty cables or connectors, can result in data transmission errors. Therefore, the LAN cable system must be tested to verify proper operation and performance.

The relative speed of data communication over LAN cable systems has been steadily increasing. 100 megabits per second is an increasingly common data rate. Copper wire LAN cable systems, closely related to traditional multiconductor telephone cable systems commonly found in commercial buildings, have been pushed to accommodate these higher data rates. Copper wire LAN cable systems have the advantage over their optical fiber counterparts of being substantially less expensive and more versatile. However, the increasing demands for network speed and associated bandwidth have been accompanied by increased burdens on the network specialist to maintain network reliability in the face of more esoteric problems encountered at higher data rates.

It is no longer sufficient to merely obtain proper electrical connections through a particular network link. More subtle problems can surface that may cumulatively destroy network performance at higher data rates. For this reason, LAN cables are now classified into different performance levels based on their ability to handle high speed data traffic. The network specialist must now be careful to select the appropriate minimum level. For example, the accidental inclusion of telephone-grade cable, which is physically similar to higher performance LAN cables but with unacceptable bandwidth and cross-talk characteristics, into a portion of the network may result in a non-functional network connection. Furthermore, the total number of LAN cable connectors, which have been found to contribute to significant performance degradations to a LAN cable system, must be kept to a minimum in a given signal path lest the cumulative network performance degradation become too severe. Critical network parameters for the network specialist to know include network bandwidth (measured in terms of signal attenuation versus frequency) and near-end cross-talk (commonly referred to as "NEXT") between twisted pairs in the cable, which also varies as a function of frequency. The terms NEXT and cross-talk will be used interchangeably because the cross-talk measurements in this context occur at the near-end of the LAN cable.

Cross-talk is a measure of the level of isolation between any two twisted-pairs within a LAN cable system. Maintaining a specified minimum level of cross-talk isolation is important in preventing interference between adjacent twisted pairs in order to maintain network reliability. The industry working group Telecommunications Industry Association (TIA) have promulgated a standard for cross-talk which specifies a minimum level of cross-talk isolation over a frequency range of 1 to 100 megahertz. The cross-talk standard is essentially a pass-fail limit line. LAN cable networks with cross-talk occurring above the limit line at any frequency is considered as failing. In maintaining a network that complies with the TIA standard, the network specialist can be reasonably assured of full network performance with no significant error contributions from cross-talk between twisted pairs.

Test instrument manufacturers are striving to build test instruments to assist the network specialist in fully testing LAN cable systems generally, including the cross-talk performance. In order for a LAN cable system to pass the TIA specified limit, the crosstalk performance of the LAN cable network must exceed the specified limit at all frequencies within the specified range. However, the cross-talk test as specified by the TIA imposes several significant burdens on test instrument designers. First, the cross-talk measurement must be done over an entire range of frequencies, thereby requiring a series of measurements which adequately cover the frequency range while maintaining an acceptable total test time and accuracy for the user. Second, the cross-talk measurement includes the performance of all connectors in the system in the mated condition only. The corollary of this rule is that a connector at the near-end of the LAN cable that is mated with the test instrument becomes part of the test instrument connector and must not be included in the measurement of the LAN cable network. The cross-talk measurement must therefore exclude or minimize the contribution of the near-end connector in order to obtain a cross-talk measurement in accordance with the TIA specification. Because the near-end connector is typically the largest contributor to the cross-talk as seen by the test instrument, steps must be taken to minimize its effects or the test instrument will become somewhat "blinded" by the effect of the near-end connector overwhelming the response of the rest of the LAN cable system resulting in poor measurement accuracy. Thus, the effects of the near-end connector must be minimized to enhance measurement accuracy and decrease the chances of incurring a false indication of pass or fail for cross-talk measurements close to the specification limit.

Prior art LAN cable test instruments that measure cross-talk performance have not fully addressed the requirements of the TIA specification. Low cost LAN cable test instruments typically evaluate cross-talk performance at only one frequency, for example 10 megahertz, and thereby provide a quick, albeit incomplete, indication of the cross-talk performance of the LAN cable system. Such an instrument operates by injecting a high frequency signal into a selected twisted-wire pair and monitoring the relative level received on another twisted-wire pair with a receiver and level detector. In this way, gross wiring errors in the LAN cable system, such as crossed-pair wiring errors, can be detected.

More elaborate LAN cable test instruments attempt to provide cross-talk measurements over the specified frequency range of 1 to 100 megahertz. As with the low-cost LAN cable test instrument, the measurement is essentially analog, with a receiver and level detector tracking the signal frequency of a test signal source and measuring the relative level of the received test signal. The test signal source may generate a series of test frequencies either in the form of a continuous swept sine or as a collection of predetermined discrete frequencies generated in a sequence. Each cross-talk measurement is then compared to the specification limit for that frequency to determine whether it passes or fails. Failure of any cross-talk measurement results in a conclusion that the LAN cable network cross-talk performance is faulty: This measurement technique tends to be relatively slow because adequate settling time must be allowed between each measurement and there is necessarily a tradeoff between total measurement time and the number of frequencies tested.

Furthermore, such instruments which measure amplitude but not phase cannot remove, or control, for the effects of the near-end connector. The solution to this nearend connector cross-talk problem has been to substitute a different type of connector at the instrument end, typically an industry-standard DB-15 type connector and mating plug, which is optimized to provide only a nominal amount of cross-talk back into the instrument. The DB-15 connector is connected to a high quality LAN cable which functions as a patch cable to the LAN cable system being tested.

A disadvantage exists when the user patch cable is considered part of the LAN cable system. Such patch cables invariably include industry-standard, high cross-talk RJ-45 connectors at each end. Thus, because a DB-15 connector does not directly mate with an RJ-45 connector, an unavoidably high cross-talk DB-15 to RJ-45 adapter is required and becomes part of the test instrument per the TIA specification. Consequently, under the common situation in which the network specialist wishes to include the user patch cable as part of the LAN cable system in order to fully test the LAN cable system, measurement accuracy is degraded by the uncertainty contributed by the RJ-45 connector. Another disadvantage of this technique is that the cross-talk effects of the DB-15 connector are reduced but cannot be completely controlled for nor eliminated from the measurement, which adversely affects the measurement accuracy of the instrument. The accuracy of the cross-talk measurement is thus highly dependent on the quality of the patch cable and connector, which thereby creates an unknown error contribution.

Therefore, it would be desirable to provide a LAN cable test instrument which rapidly measures the cross-talk response of a LAN cable system over a desired frequency range of 0.1 to 100 megahertz and which automatically compensates for and electronically removes the effects of the near-end network connector to achieve improved cross-talk measurement accuracy and to eliminate the need for a special instrument connector, patch cable, and adapters.

SUMMARY OF THE INVENTION

In accordance with the present invention, a pulse-based cross-talk LAN cable test instrument provides a measurement of the cross-talk characteristic of a LAN cable system as a function of frequency in order to evaluate its relative performance.

A cable test instrument applies a test signal in the form of narrow pulses to a selected transmission line of a LAN cable while the cross-talk response induced in another transmission line in the same LAN cable is measured and stored as a time record in digital memory. The instrument is connected to the near-end of the LAN cable while a remote unit provides proper termination at the far-end to prevent unwanted reflections of the test signal. In an unshielded twisted-pair (type "UTP") LAN cable, each transmission line consists of a twisted-wire pair. The time record is built over a series of measurements using a sequential sampling technique to improve the effective time resolution of the measurement. The LAN cable test instrument analyzes the cross-talk response by performing a discrete Fourier transform on the time record to provide cross-talk versus frequency information. The measured cross-talk may then be compared with a specification limit line to reach a pass-fail decision which is communicated to the instrument user.

Enhanced accuracy of the cross-talk measurement employing a pulse-based measurement technique is obtained in two ways. First, a selected set of pulses, with differing pulse durations that correspond with optimal signal energy at desired frequency ranges, are chosen such that a composite frequency response can be assembled using measurements based on each of the pulses of the set. Conducting measurements based on pulses of differing width takes advantage of a well-known property called bandwidth-time invariance in which narrower pulses spread their energy over a wider frequency spectrum but at a correspondingly lower amplitude. Conversely, wider pulses can be employed to provide extra energy for measurements at lower frequency ranges for improved measurement accuracy.

Second, the cross-talk effects of the near-end connector coupled directly to the test instrument are measured separately from the rest of the LAN cable system and mathematically subtracted from the cross-talk measurement. This technique takes advantage of the fact that, although the cross-talk characteristic of a given connector is not known, its physical location and corresponding location in the time record is known, allowing the effects of the near-end connector to be separately measured. During the course of a cross-talk measurement, the effects of the near-end network connector coupled to the test instrument are mathematically subtracted from the composite measurement that includes both the near-end connector and the remainder of the LAN cable system, leaving only the response of the LAN cable system.

One object of the present invention is to provide a test instrument capable of measuring cross-talk between transmission lines of a LAN cable system as a function of frequency with enhanced measurement accuracy.

Another object of the present invention is to provide a test instrument capable of measuring cross-talk between transmission lines of a LAN cable system as a function of frequency with enhanced measurement accuracy by employing stimulus pulses of selected pulse widths.

An additional object of the present invention is to provide a test instrument capable of measuring cross-talk between a pair of transmission lines of a LAN cable system as a function of frequency with enhanced measurement accuracy by electronically removing undesirable cross-talk effects at a selected distance along the pair of transmission lines.

Another object of the present invention is to provide a LAN cable test instrument capable of measuring near-end cross-talk as a function of frequency by employing stimulus pulses of selected widths and electronically removing the cross-talk effects of the near-end network connector.

Other features, attainments, and advantages will become apparent to those skilled in the art upon a reading of the following description when taken in conjunction with the accompanying drawings.

DETAILED DESCRIPTION OF THE INVENTION

Figure 1:
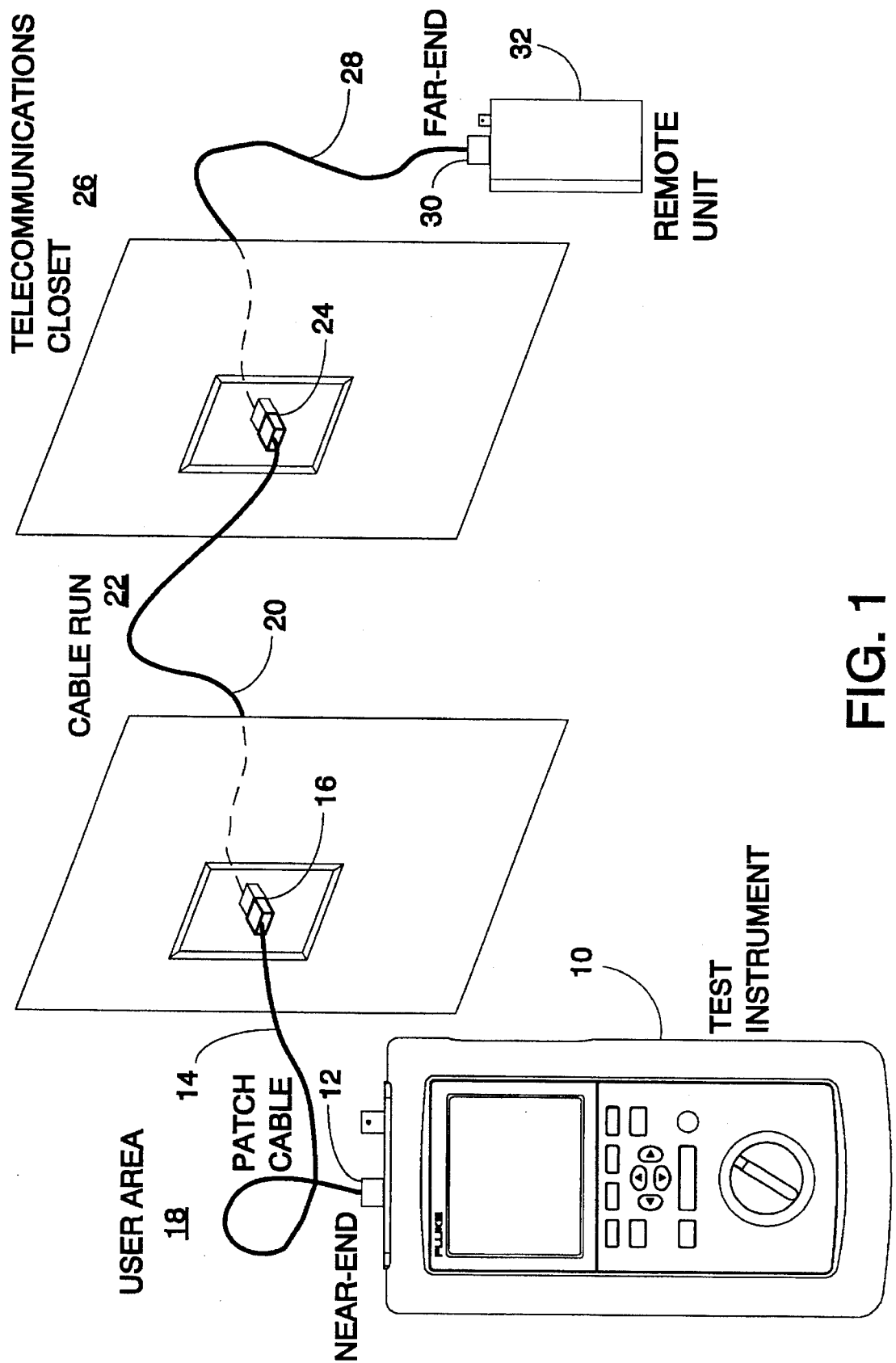
FIG. 1 is an illustration of a LAN cable test instrument and a remote unit coupled to the near-end and the far-end respectively of a LAN cable system.

FIG. 1 is an illustration of a LAN cable test instrument and a remote unit coupled to the near-end and the far-end respectively of a typical LAN cable system. The terms near-end and far-end are adopted by convention to mean the respective ends of LAN cable connection, with the near-end being that with the test instrument 10 and the far-end being the opposite end. A test instrument 10 is coupled via a near-end connector 12 and a patch cable 14 to a connector 16. The test instrument 10 is typically applied in a user area 18 in which the desired peripherals such as computer workstations and printers are located in a typical office environment. The connector 16 is coupled to a LAN cable 20 located in a cable run 22. The cable run 22 is the route of the LAN cable 20 through the physical facility, and may run under floors, through walls, above ceilings, and other spaces within the facility. The length of the LAN cable 20 is typically limited to 100 meters and may have multiple LAN cable connectors within its span, as required to gain extensions or repair breaks. The LAN cable 20 is coupled to a connector 24 which appears at a telecommunications closet 26 which typically comprises a centralized receiving point for multiple user areas 18 and contains LAN network distribution equipment including, for example, "hubs", "routers", and "bridges", which are well known in the data communications field to facilitate network communication functions. A patch cable 28 coupled to a far-end connector 30 complete the LAN connection. To facilitate the testing of the connection through the LAN cable, a remote unit 32 is coupled to the far-end connector 30 to provide a proper termination of the test signals generated by the test instrument 10.

Figure 2:
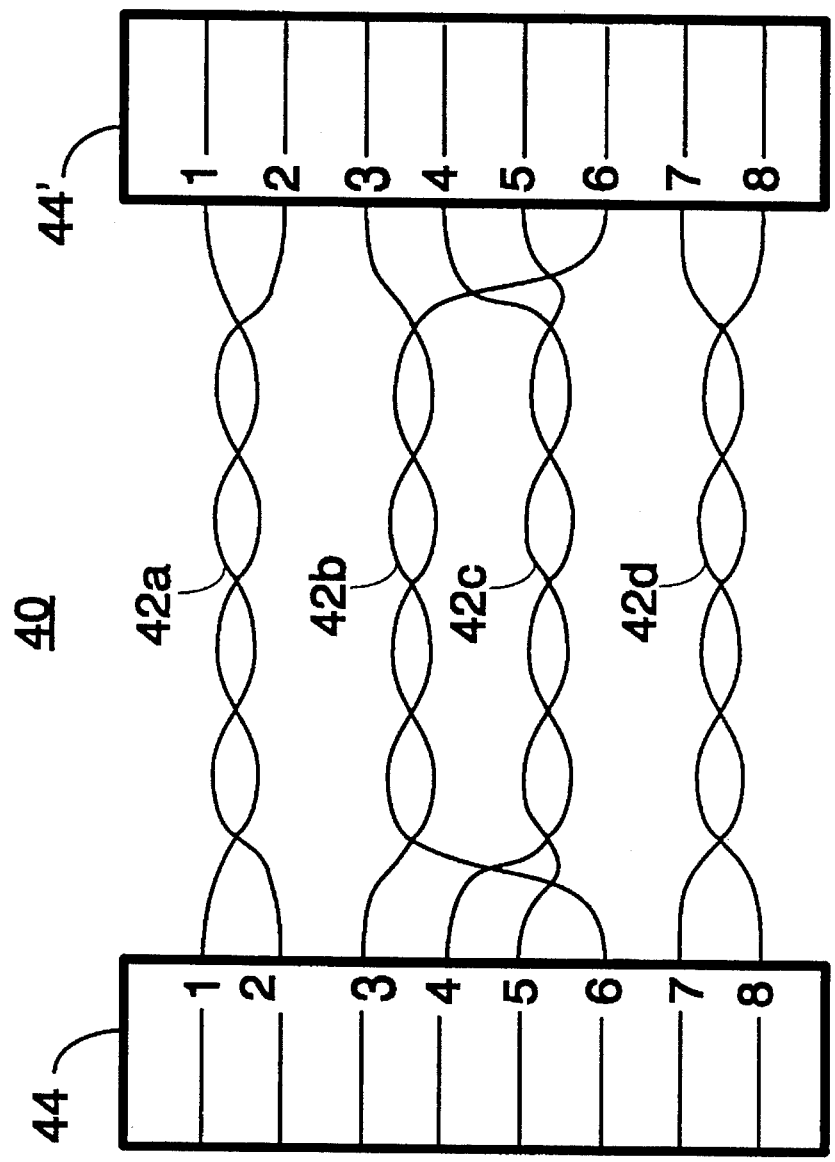
FIG. 2 is a schematic diagram of a LAN cable tested by the LAN cable test instrument.

FIG. 2 is a schematic diagram of a typical UTP, eight-conductor, copper-wire LAN cable 40 that is tested by the present invention. Wire pairs 42a–d are twisted together within the LAN cable 40 in such a way as to maximize the signal isolation or cross-talk between any two wire-pairs. On either end of the LAN cable 40 are LAN cable connectors 44 and 44' which mate with other LAN cable connectors to form the desired electrical connections according to industry convention. Wire pairs 42a–d are coupled to a predetermined set of connections within the connectors 44 and 44' to form pairs 1–2, 3–6, 4–5, and 7–8 respectively which function as the four separate, independent transmission lines. The connectors 44 and 44' are called the type RJ-45 connector which is adopted from the telephone industry. Multiple LAN cables 40 are coupled together by mating the connectors 44 and 44' to form completed connections. The LAN cable 40 and the LAN cable connectors 44 and 44' thus comprise the basic building block of a LAN cable system with may be comprised of any number of such building blocks.

The key in achieving a desired level of cross-talk performance is in maintaining a balanced capacitance between any two twisted pairs in the LAN cable 40 so that signal voltages in one twisted pair do not induce voltages in another twisted pair. This capacitance balance has become increasingly critical as the frequency of the signal voltage has increased due to higher data rates sent through the LAN cable 40. The LAN cable 40 is available commercially under assorted data grades which define its level of performance over desired frequency range. This level of performance is a direct function of the physical consistency of the twisting of the wire pairs 42a–d along any given span of the LAN cable. Because of continual improvements in the manufacturing of the LAN cable 40 thereby increasing its relative data grade, the mated connectors 44 and 44' are often the primary contributors to the overall capacitance imbalance between any two wire pairs. The number of such mated connections in a LAN cable system often becomes a matter of concern in maintaining network performance at higher data rates.

Figure 3:
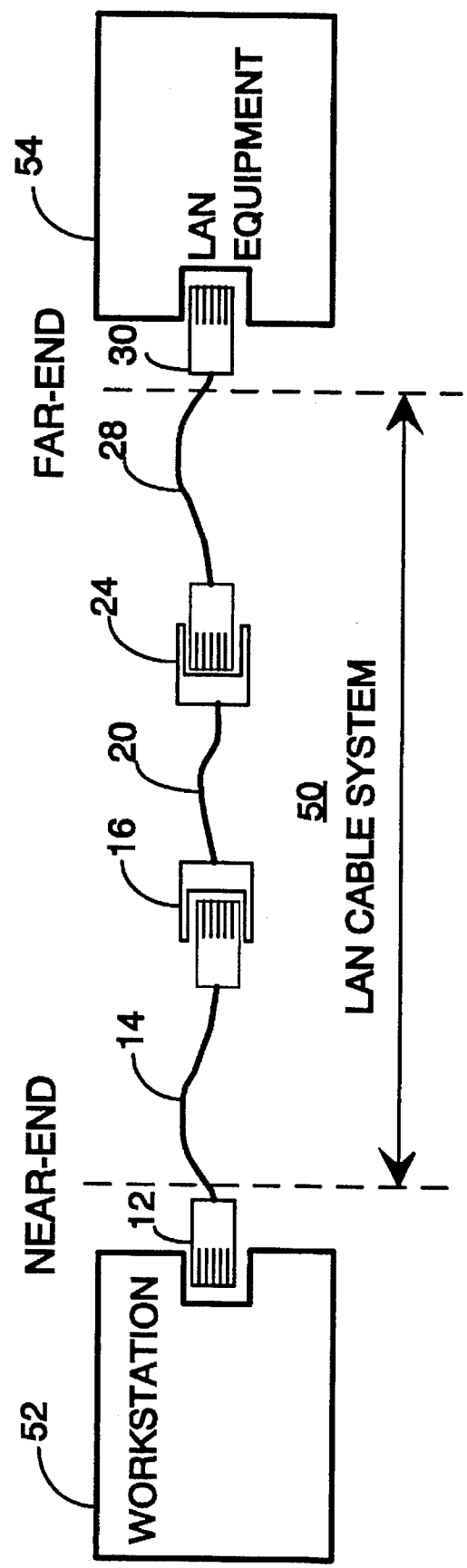
FIG. 3 is a schematic diagram that defines a LAN cable system.

FIG. 3 is a schematic diagram that defines a LAN cable system 50 for the purposes of a cross-talk measurement standard. Because of the uncertainties faced by the network specialist regarding the data grades of all the LAN cables forming the segments between the near-end and the far-end of a LAN cable connection, the relative lengths of each segment, and number of LAN cable connectors between the near-end and the far-end, measuring the level of cross-talk through the entire network of connections therefore becomes critical.

At the same time, a need for a standardized method of measuring cross-talk required a universal definition of what comprises a LAN cable system 10. The Telecommunications Industry Association (TIA) arrived at a definition that a LAN cable system includes all mated connections between the near-end and the far-end excluding the near-end and far-end connectors themselves. The near-end connector 12 is mated with a workstation 52 and thus becomes part of the workstation and not part of the LAN cable system 50. Similarly, the far-end connector 30 is mated with LAN equipment 54, which may comprise a hub, bridge, router, or patch panel, and therefore becomes part of the LAN equipment 54. The LAN cable system 50 comprises the patch cable 14 (shown in FIG. 1), the LAN cable connector 16, the LAN cable 20, the LAN cable connector 24, and the patch cable 28. Excluded are the contributions to cross talk of the near-end connector 12 and the far-end connector 30 because they are mated with the workstation 52 and the LAN equipment 54 respectively, which are not pan of the LAN cable system 50. Under this definition, the test instrument 10 (shown in FIG. 1) which mates with the near-end connector 12 must therefore attempt to exclude the contribution of the near-end connector 12 and the far-end connector 30 in order to obtain a cross-talk measurement that fully conforms to the industry definition.

Figure 4:
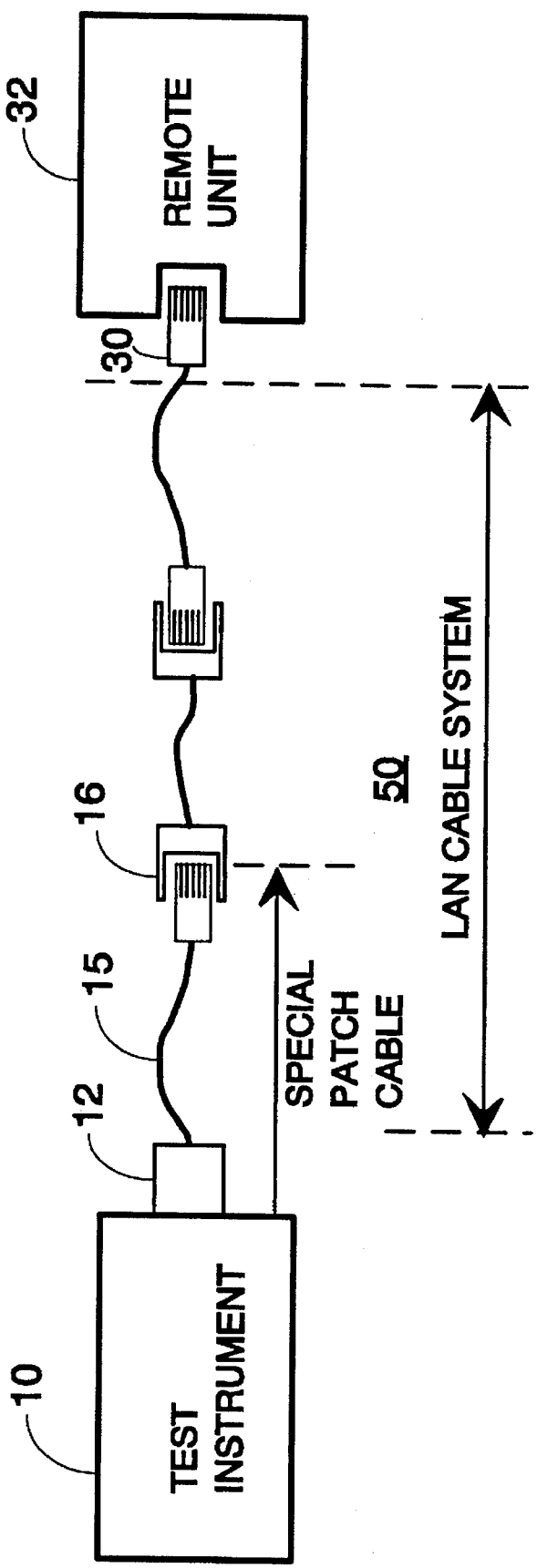
FIG. 4 is a diagram illustrating a LAN cable test instrument and remote unit testing the LAN cable system with a special instrument patch cable according to the prior art.

FIG. 4 is a diagram illustrating a LAN cable test instrument and remote unit testing the LAN cable system according to the prior art. The instrument 10 (shown in FIG. 1) is coupled via the connector 12 to the LAN cable system 50 via an special patch cable 15 which replaces the user patch cable 14 of FIG. 3 for the cross-talk measurement.

The instrument 10 is coupled to the near-end connector 12 which in turn is coupled to the patch cable 15. In order to conform as closely as possible to the TIA definition of a LAN cable system, the contributions to cross-talk of the near-end connector 12 must be minimized. Because the measurement is analog, the cross-talk contribution of the near-end connector 12 is minimized mechanically by employing a special connector such as a type DB-15 that has a better capacitance balance than the industry standard RJ-45 45 connector. Employing a special connector for the near-end connector 12 requires the special patch cable 15 which is unique to the test instrument 10. The patch cable 15 is coupled to the LAN cable connector 16 and is measured as part of the LAN cable system 50. The contribution to the cross-talk measurement of the near-end connector 12, while assumed to be low, cannot be controlled for under this arrangement. Furthermore, the user patch cable 14 which normally connects to the workstation 52 is not tested because it has been replaced with the instrument patch cable 15.

Cross-talk measurements are performed by injecting a test signal into a twisted-pair of the LAN cable system 50 (shown in FIG. 3) and measuring the relative signal level induced in another twisted-pair as measured at the near-end by the instrument 10. In the prior art, the test signal is an analog signal of known level and the test signal is monitored by an analog receiver within the instrument 10 which functions as a level detector. For example, a 10 megahertz cross-talk measurement may be performed by injecting a sine wave with a frequency of 10 megahertz into twisted pair 1–2 and measuring the induced signal level in twisted pairs 3–6, 4–5, or 7–8. The ratio of the induced signal level to the injected signal level may be expressed in decibels (dB) to express the level of cross-talk isolation between any two twisted pairs.

Because a cross-talk measurement typically does not vary smoothly as a function of frequency, the cross-talk measurement must be performed over multiple frequencies and compared against a specification limit. It is desirable to check the cross-talk performance at a substantial number of frequencies within the range of interest to avoid missing a failing cross-talk measurement which may fall between other measurement frequencies.

Performing more cross-talk measurements with increasingly fine frequency spacing comes at the expense of increased total measurement time and frequency resolution is thus traded off against the probability of missing a failing cross-talk measurement. In the prior art, adding measurement frequencies directly increases total measurement time because each measurement requires a fixed amount of time to complete. In the present invention, the use of the fast Fourier transform to achieve a frequency representation of a digitized time record has resulted in substantial gains in measurement speed for a given frequency resolution as compared with the prior art. Cross-talk measurements at frequency increments of 150 kilohertz over the frequency range of 1 to 100 megahertz are generally considered adequate to accurately measure the worst case margin to the specification limit line, based on empirical findings.

Figure 5:
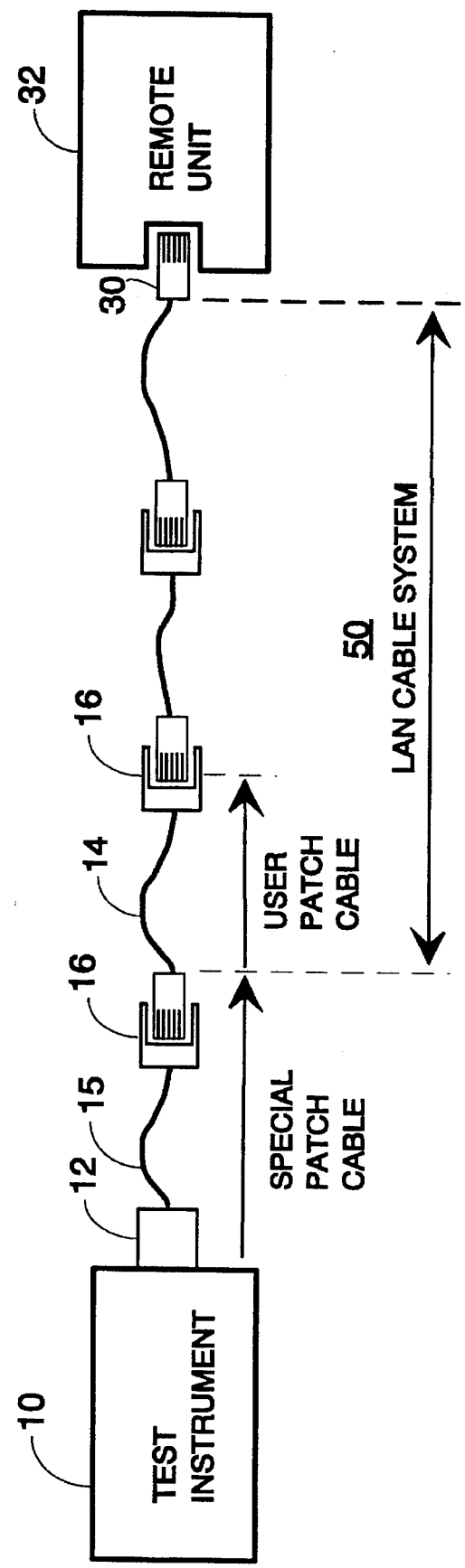
FIG. 5 is a diagram illustrating a LAN cable test instrument and remote unit testing the LAN cable system including a user patch cable and a special instrument patch cable according to the prior art.

FIG. 5 is a diagram illustrating a LAN cable test instrument and remote unit testing the LAN cable system including a user patch cable and a special patch cable according to the prior art. The instrument 10 is coupled to the connector 12 and instrument patch cable 15 as in FIG. 4. The user patch cable 14 couples the instrument patch 15 to the connector 16. This situation would occur when the network specialist desires to test the entire LAN cable system 50 including the user patch cable 14. The disadvantage of this technique is that the connector 16 is now part of the test instrument 10 and its cross-talk contributions become an error source to the overall cross-talk measurement. Thus, the cross-talk measurement is degraded from its actual level because of the undesired inclusion of the connector 16 in the cross-talk response. Connector 16 is necessarily of type R J-45 in most cases to properly mate with the corresponding connector in the LAN cable system 50 and thus contributes a significant amount of cross-talk.

Figure 6:
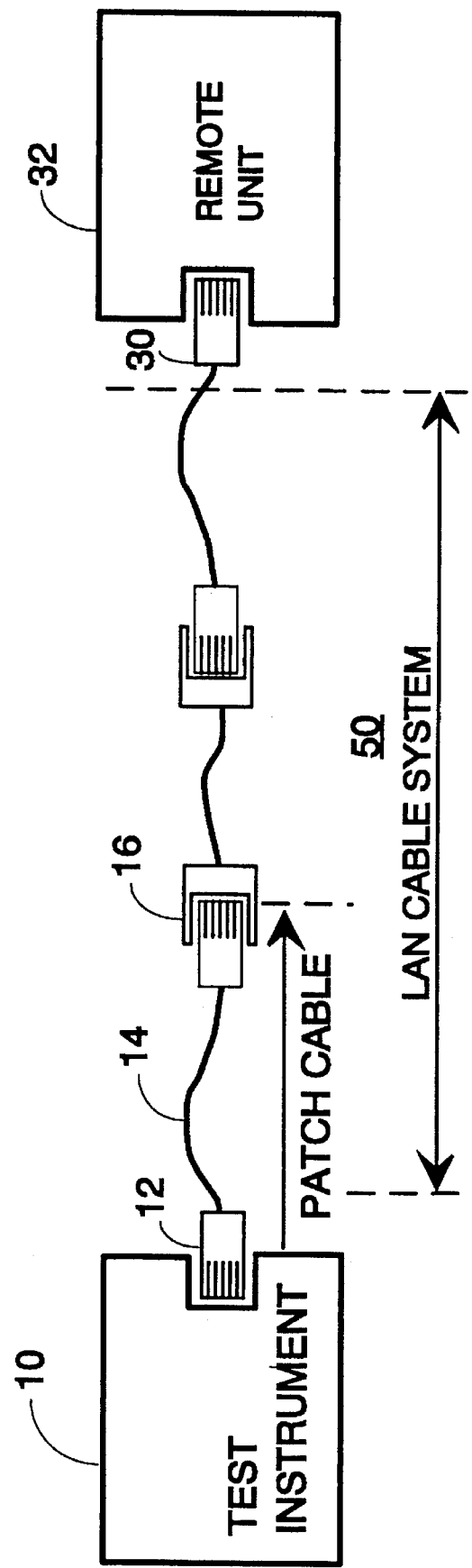
FIG. 6 is a diagram illustrating a LAN cable test instrument and remote unit testing the LAN cable system according to the present invention.

FIG. 6 is a diagram illustrating a LAN cable instrument and remote unit testing the LAN cable system according to the present invention. The instrument 10 (shown in FIG. 1) is coupled to the near-end connector 12 which in turn is coupled to the patch cable 14 similar to the diagram of FIG. 4 but with the difference that the instrument 10 of the present invention may connect to the near-end connector 12 in the form of the industry-standard RJ-45 connector.

The LAN cable system, including the same patch cable 14 that couples the workstation 52 (shown in FIG. 3) to the LAN cable connector 16 may be tested simply by removing the near-end connector 12 from the workstation 52 and coupling it to the instrument 10 without having to substitute a special patch cable. In this way, the cross-talk measurement of the LAN cable system 50 by the instrument 10 more closely matches the cross-talk level actually encountered by the workstation 52 under normal operation. The remote unit 32 is coupled to the far-end connector and provides proper termination of the LAN cable system as in FIG. 4.

Using a series of narrow pulses as the test signal, the instrument 10 of the present invention electronically measures the cross-talk of the near-end connector 12 and mathematically removes its cross-talk contribution from the cross-talk measurement of the LAN cable system 50. The instrument 10 thus does not depend on the relative cross-talk performance of any particular near-end connector 12. The user patch cable 14 may be used if its length is at least 2 meters so that the cross-talk effects of the connector 12 may be measured and removed. The measurement is also in accordance with the TIA "channel" definition, which specifically includes the user patch 14 but excludes the connector 12. The method of measuring and mathematically removing the cross-talk contribution of the near-end connector 12 is explained more fully below.

Figure 7:
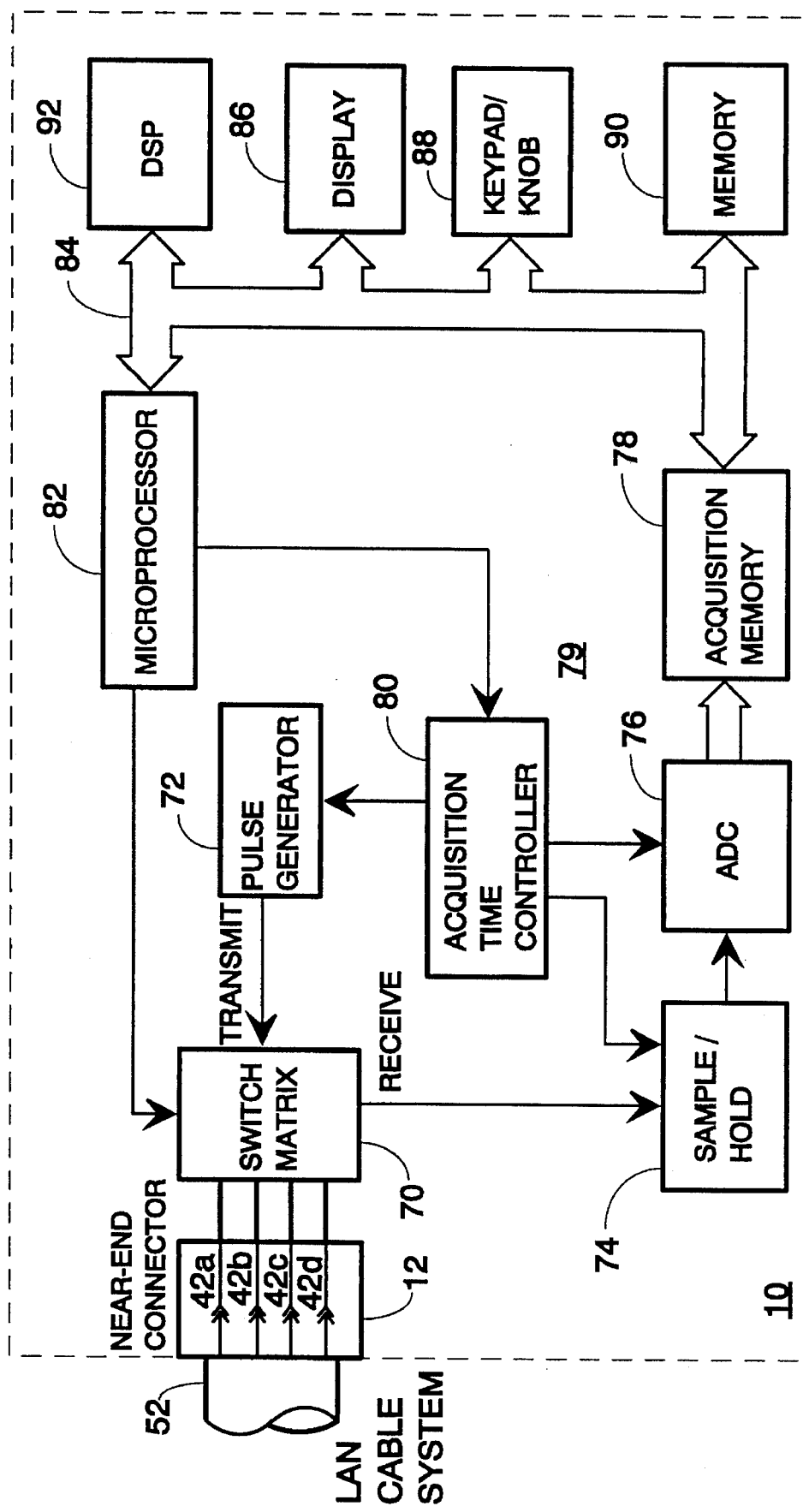
FIG. 7 is a simplified block diagram of the LAN cable test instrument according to the present invention.

FIG. 7 is a simplified block diagram of the test instrument 10 (shown in FIG. 1) according to the present invention. The near-end connector 12 is coupled to the wire pairs 42a–d (shown in FIG. 2) contained with the LAN cable system 52. The wire pairs 42a–d are further coupled to a switch matrix 70 which selectively couples one of the wire pairs 42a–d to an output of a pulse generator 72 and selectively couples another of the wire pairs 42a–d to an input of a sample-and-hold circuit (S/H) 74 which captures a voltage level present at the input upon receipt of a signal at a control input. Each wire pair is essentially a balanced transmission line. The output of the pulse generator 72 and the input of the S/H 74 are unbalanced or referenced to ground in the preferred embodiment of the present invention, requiting the addition of transformers (not shown) for each wire pair to convert from a balanced to an unbalanced transmission line. The wire pairs 42a–d are drawn as single lines because each pair constitutes a single transmission line. The pulse generator 72 sends a pulse on receipt of a signal at a control input. An output of the sample-and-hold circuit is coupled to an input of an analog-to-digital converter (ADC) 76 which digitizes the voltage level received from the S/H 74 on receipt of a signal at a control input. An output of the ADC 76 is coupled to an acquisition memory 78 which stores the digital measurements as a digital time record on receipt of a signal at a control input. An acquisition time controller 80 is coupled to the control input of the S/H 74, ADC 76, and pulse generator 72 to facilitate a repetitive digital sampling process that achieves a high equivalent sampling rate with a minimum of timing errors by the coordinated generation of the control signals at the proper times to the respective control inputs of the S/H 74, ADC 76, and pulse generator 72. The S/H 74, ADC 76, acquisition time controller 80 and acquisition memory 78 together comprise a digitizer 79 which digitizes the received pulse responses using repetitive sequential sampling to obtain a higher equivalent sampling rate than is readily obtainable with real-time sampling techniques. In the preferred embodiment of the present invention, the equivalent sampling rate of the digitizer 79 is 500 megasamples per second, or conversely, a time resolution of 2 nanoseconds per point. The measurement process is then one of assembling a 4,096 point time record sample by sample with 2 nanosecond resolution in the acquisition memory 78 at an actual sample rate of approximately 4 megahertz. A 4,096 point discrete Fourier transform is then calculated to obtain the frequency domain representation of the time record.

A microprocessor 82 controls the overall measurement process and is coupled to a control input of the switch matrix 70 to select the respective wire pairs to measure and to a control input of the acquisition time controller 80 to control the acquisition process. The microprocessor 82 is further coupled to a display 86, a keypad/knob 88, an instrument memory 90, and a digital signal processor (DSP) 92 via an instrument bus 84. Instrumentation bus 84 contains parallel data and address lines to facilitate communications between the devices in a manner well known in the electronics field. A time record collected in the acquisition memory 78 is transferred to the instrument memory 90 for storage or further digital manipulation such as discrete Fourier transform. DSP 92, a special-purpose signal processing circuit, may be used in lieu of the microprocessor 82 to convert a time record into a frequency domain representation using a discrete Fourier transform function. The DSP 92 is a commercially available signal processor integrated circuit that is typically faster at performing fast Fourier transforms than a general purpose microprocessor at equivalent clock speeds. The keypad/knob 88 and display 86 comprise the user interface of the instrument 10. The memory 90 is used to store digital time records, frequency domain representations, and instrument calibration data and may be comprised of a single integrated circuit or multiple integrated circuits using technologies well known in the electronics field.

Figure 8A:
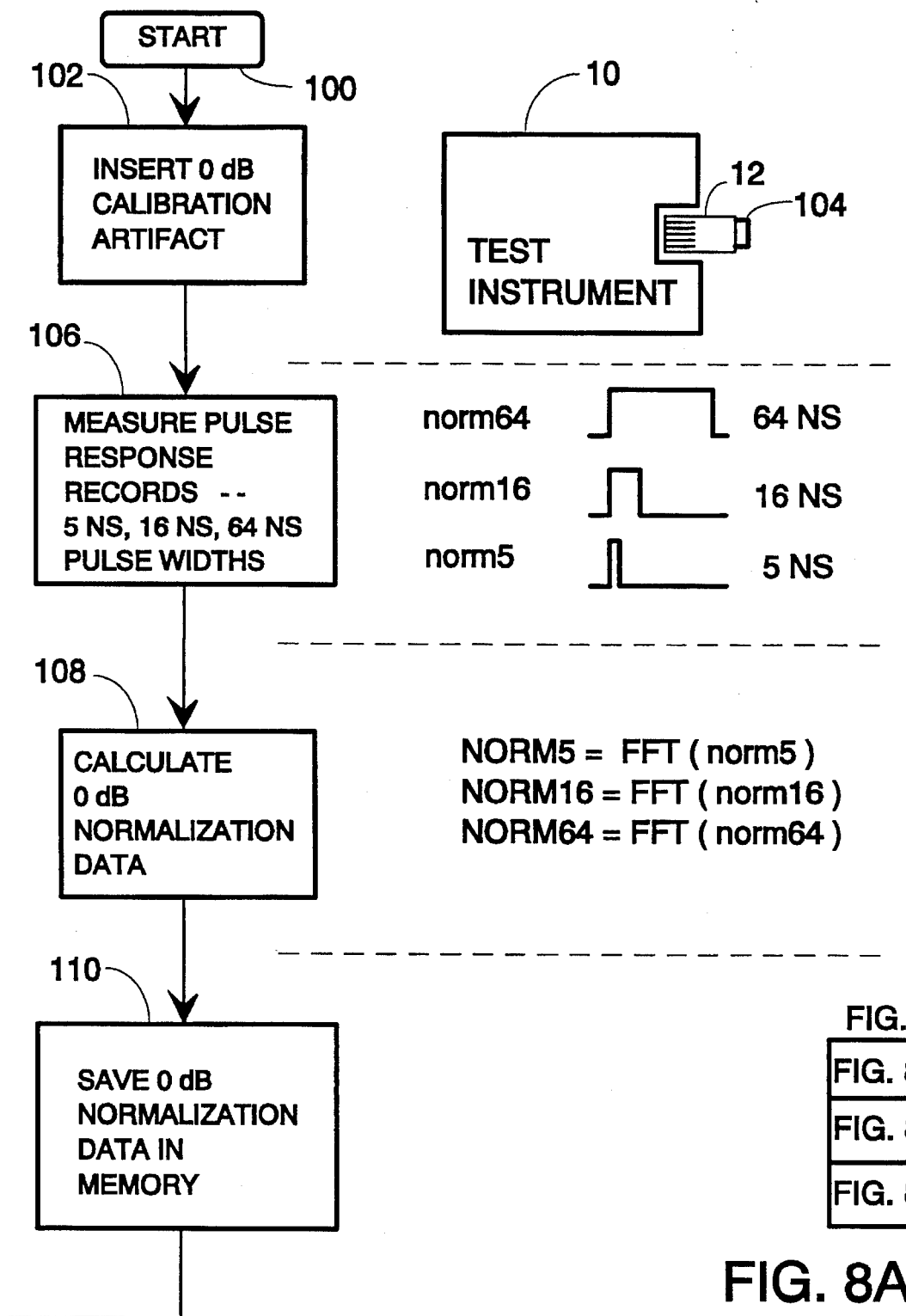
FIG. 8, comprised of FIG. 8A, 8B, and 8C, is a flow chart of the overall measurement process employed by the LAN cable test instrument according to the present invention.
Figure 8B:
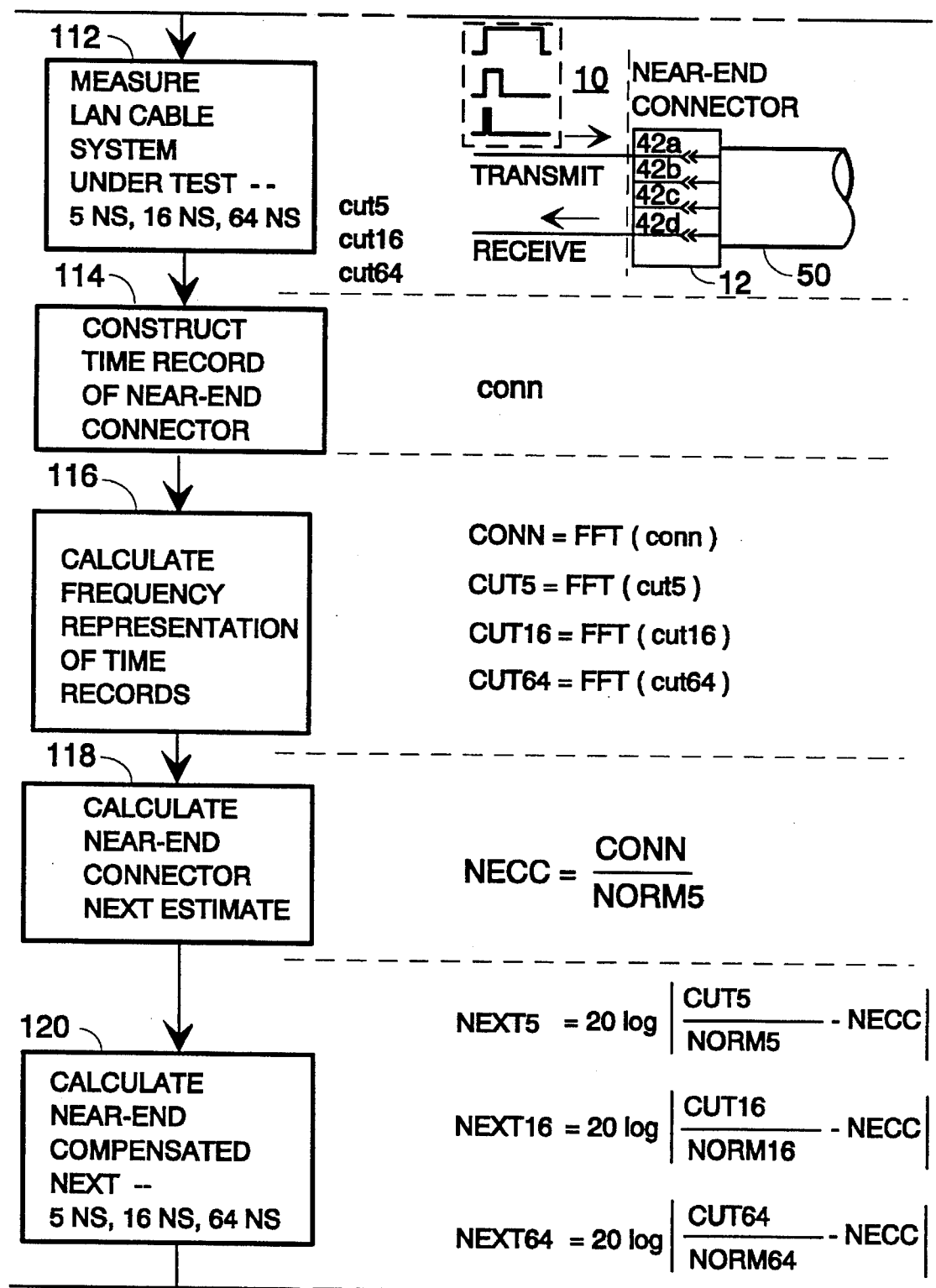
Figure 8C:
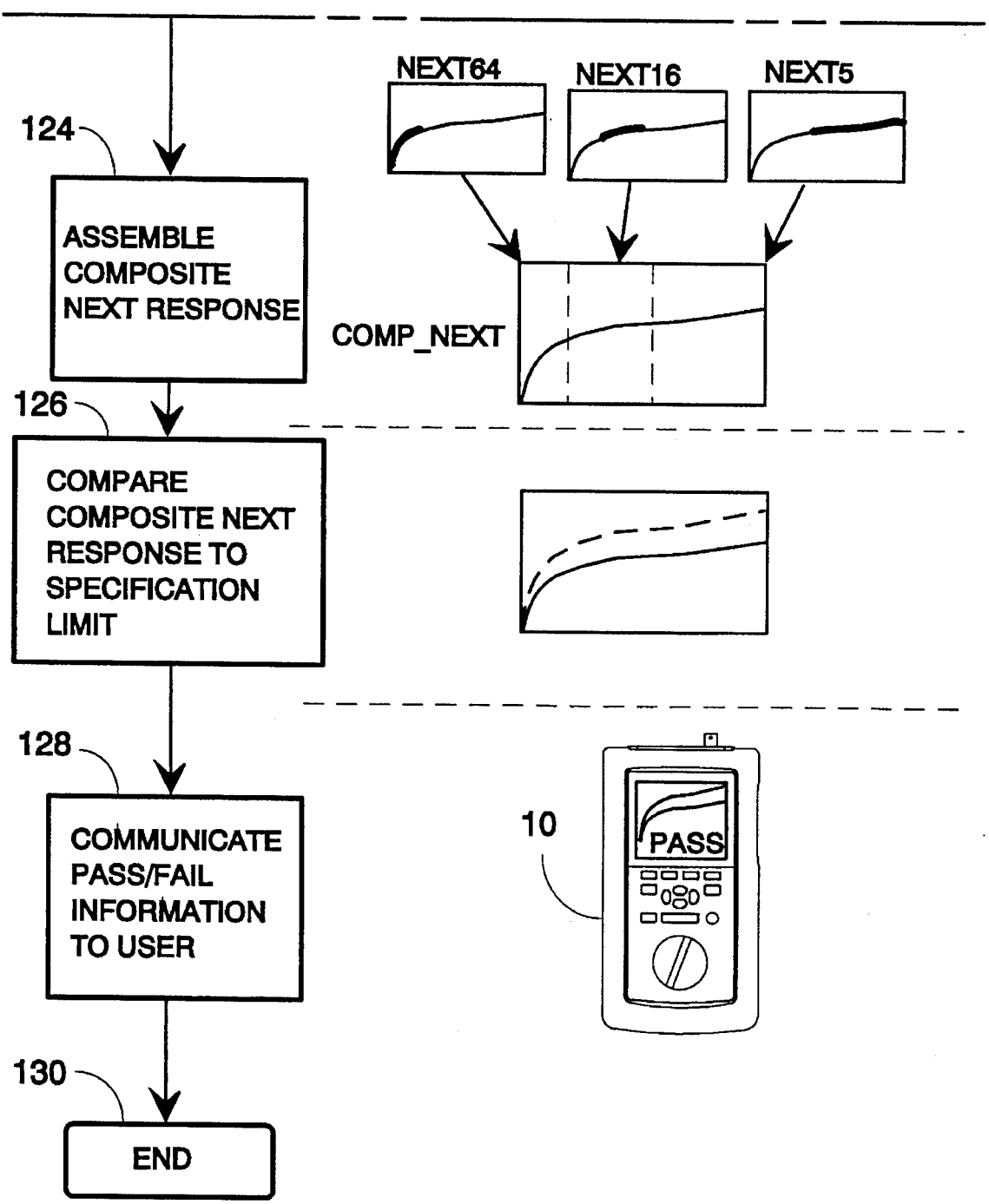

FIG. 8, comprised of FIG. 8A, 8B, and 8C, is a flow chart of the overall measurement process employed by the LAN cable test instrument according to the present invention. FIG. 8A covers the process of measuring the 5, 16, and 64 nanosecond calibration pulse responses by connecting the receive and transmit channels with a substantially lossless, 0 decibel reference connection in order to normalize subsequent measurements against that direct measurement. FIG. 8B covers the process of measuring the pulse-response of the LAN cable system 50 (shown in FIG. 3) using 5 nanosecond, 16 nanosecond, and 64 nanosecond pulse widths, removing the cross-talk effects of the near-end connector 12, and calculating the frequency domain cross-talk function for each pulse response. FIG. 8C covers the process of assembling the composite cross-talk response of the LAN cable system 50 from the three cross-talk functions, comparing the composite response against a specification limit, and providing measurement results to the user.

Arriving at a composite cross-talk response requires using a substantial amount of data storage and mathematical manipulation. Two primary types of data records are employed in the present invention: time domain records and frequency domain records. Frequency domain records are related to their equivalent time domain records via the Fourier transform and the data are in the form of complex numbers with real and imaginary components. Time domain records contain only real data with no imaginary components. By convention, the time domain records are assigned names in lower case letters and the equivalent frequency domain records are assigned the same names but in upper case.

The following table summarizes all of the variables relevant to the measurement process explained in FIG. 8A–C. Each of the variables represents a series of data stored as an array data structure with individual data points normally accessible by use of indices in a manner well known in the computer field.

norm64—the time record of the 64 nanosecond pulse response when the transmit and receive channels are connected together where "norm" refers to normalization dam.

NORM64—the frequency domain representation of norm64 which represents the 0dB reference level for normalizing cross-talk measurements using 64 nanosecond pulses where "NORM" refers to normalization data.

norm16—the time record of the 16 nanosecond pulse response when the transmit and receive channels are connected together where "norm" refers to normalization dam.

NORM16—the frequency domain representation of norm16 which represents the 0dB reference level for normalizing cross-talk measurements using 16 nanosecond pulses where "NORM" refers to normalization data.

norm5—the time record of the 5 nanosecond pulse response when the transmit and receive channels are connected together where "norm" refers to normalization data NORM5—the frequency domain representation of norm5 which represents the 0 dB reference level for normalizing cross-talk measurements using 5 nanosecond pulses where "NORM" refers to normalization data.

cut5—the time record of the 5 nanosecond pulse response of the LAN cable system with the transmit channel coupled to a transmission line and the receive channel coupled to another transmission where "cut" refers to cable under test.

CUT5—the frequency domain representation of cut5 where "CUT" refers to cable under test.

cut16—the time record of the 16 nanosecond pulse response of the LAN cable system with the transmit channel coupled to a transmission line and the receive channel coupled to another transmission line where "cut" refers to cable under test.

CUT16—the frequency domain representation of cut16 where "CUT" refers to cable under test.

cut64—the time record of the 64 nanosecond pulse response of the LAN cable system with the transmit channel coupled to a transmission line and the receive channel coupled to another transmission.

CUT64—the frequency domain representation of cut16 where "CUT" refers to cable under test.

necc—the time record of the near-end connector pulse response as constructed from data contained in cut5 where "necc" refers to near-end connector cross-talk.

NECC—the frequency domain representation of necc where "NECC" refers to near-end connector cross-talk.

NEXT5—the frequency domain representation of the near-end cross-talk response of the LAN cable system using the 5 nanosecond pulse response of the LAN cable system which is calculated by dividing CUT5 by NORM5 (normalization) and subtracting NECC (near-end compensation).

NEXT16—the frequency domain representation of the near-end cross-talk response of the LAN cable system using the 16 nanosecond pulse response of the LAN cable system which is calculated by dividing CUT5 by NORM5 (normalization) and subtracting NECC (near-end compensation).

NEXT64—the frequency domain representation of the near-end cross-talk response of the LAN cable system using the 64 nanosecond pulse response of the LAN cable system which is calculated by dividing CUT5 by NORM5 (normalization) and subtracting NECC (near-end compensation).

COMP_NEXT—the frequency domain representation of the near-end cross-talk response of the LAN cable system using selected portions of NEXT5, NEXT16, and NEXT64 concatenated together.

Referring now to FIG. 8A, the measurement process begins with a process 100 labeled START wherein the test instrument 10 (shown in FIG. 1) may be first started and initialized. Process 102 labeled INSERT 0 dB CALIBRATION ARTIFACT is an instrument calibration process in which 5, 16, and 64 nanosecond width pulses generated by the pulse generator 72 over the TRANSMIT line (shown in FIG. 7) are coupled via a short connection 104 to the RECEIVE line and the S/H 74. The connector 12 has a substantially lossless, 0 decibel reference connection which comprises an electrical short 104 between a selected combination of wire pairs chosen to correspond with the setting of the switch matrix 70. The connector 12 is in turn coupled to the instrument 10 for calibration purposes.

Process 106 labeled MEASURE PULSE RESPONSE RECORDS—5 NS, 16 NS, 64 NS PULSE WIDTHS is a measurement of the pulses generated by the pulse generator 72 (shown in FIG. 7) so that subsequent pulse response measurements may be normalized against that direct measurement. The pulse response is measured by the test instrument 10 and time records containing the 4,096 point measured pulse response records named norm5, norm 16, and norm64 are created and stored in the memory 90. The names norm5, norm16, and norm64 are a symbolic representation of the amplitude data stored as a time record commonly stored in the form of an array data structure with individual data points within the array accessible via an index.

In process 108, labeled CALCULATE 0 dB NORMALIZATION DATA, frequency representations of norm5, norm16, and norm64 are calculated using a fast Fourier transform in a matter well known in the electronics field using the DSP 92 (shown in FIG. 6). In the preferred embodiment of the present invention, the chosen length of norm5, norm16, and norm64 is 4096 points, which is a power of 2 to facilitate a fast Fourier transform (FFr), an efficient implementation of the discrete Fourier transform algorithm employed by the DSP 92.

NORM5=FFT (norm5)

NORM16=FFT (norm16)

NORM64=FFT (norm64)

NORM5, NORM16, and NORM64, in upper case, are the frequency domain representations of the time records norm5, norm16, and norm64 which constitute the normalization data that represent the calibration data of the instrument 10. The data contained in NORM5, NORM16, and NORM64 are complex values as a function of frequency. A set of normalization data NORM5, NORM16, and NORM64 would be acquired and stored in the memory 90 for every combination of twisted pairs in the preferred embodiment of the present invention.

In process 110 labeled SAVE 0 dB NORMALIZATION DATA IN MEMORY, the normalization data are stored in the memory 90 (stored in FIG. 7). The DSP 92 produces data files containing complex numbers which comprise real and imaginary components which are stored as NORM5, NORM16, and NORM64 in the memory 90 as array data structures. The processes 102, 106, and 108 for obtaining normalization data are typically performed as a factory calibration of the instrument 10 and the NORM5, NORM16, and NORM64 data are stored in memory 90 on a semi-permanent basis until the next instrument calibration. A typical period between factory calibrations is 12 months in the preferred embodiment of the present invention.

Referring now to FIG. 8B, the measurement process continues with a process 112 labeled MEASURE LAN CABLE SYSTEM UNDER TEST—5 NS, 16 NS, 64 NS.

The same selected wire pairs 40a and 40d, corresponding to the wire pairs chosen in the processes 108 and 110 (shown in FIG. 8A) for the 0 dB calibration measurement, are chosen for measurement in the process 112. In the process 112, the LAN cable system 50 is measured by repetitively sampling a stream of pulses of a selected pulse width into the wire pair 40a. The response of each pulse at a selected time interval is then measured and stored at the appropriate location in the time record in the acquisition memory 78 (shown in FIG. 6). Completed pulse-response time records of the LAN cable system 50 at pulse widths of 5, 16 and 64 nanoseconds are then stored in memory 90 as cut5, cut16, and cut64 as array data structures.

In process 114, labeled CONSTRUCT TIME RECORD OF NEAR END CONNECTOR, the cross-talk response of the connector 12 is constructed from the pulse response data contained in cut5 to form an undesired-response time record. The 5 nanosecond pulse response data was chosen because it provides the highest resolution which is necessary to separate the pulse response of the connector 12 from the pulse response of the adjacent connector 16 (shown in FIG. 1). The cross-talk response of the connector 12 may be readily extracted from the data contained in cut5 because its location along the pair of transmission lines represented by the wire pairs 40a and 40d is known and remains constant. This location is selected using the index of array of data stored in cut5 and the data copied to another data array called conn. Because there is some overlap between the pulse responses of the connectors 12 and 16, the overlapping portion is ignored, resulting in a truncated estimate of the undesired pulse response of the connector 12. In this way, the undesired-response time record conn is constructed to contain only the pulse response of the connector 12. This process of constructing the pulse response record of the connector 12 is explained more fully below.

In process 116, labeled CALCULATE FREQUENCY REPRESENTATION OF TIME RECORDS, the frequency domain representation of the time records conn, cut5, cut16, and cut64, which have been obtained as explained above, are computed using the DSP 92 (shown in FIG. 7). The lengths of conn, cut5, cut16, and cut64 are all 4,096 points, which is a power of 2, to facilitate the fast Fourier calculation.

CONN=FFT (conn)

CUT5=FFT (cut5)

CUT16=FFT (cut16)

CUT64=FFT (cut64)

The results of each calculation are stored in memory 90 as CONN, CUT5, CUT16, and CUT64 respectively. The frequency resolution of the points in the data files CONN, CUTS, CUT16, and CUT64 is derived using the following formula:

Frequency Resolution (Hertz)=(effective sample rate/ length of time record)

=500 megahertz/4,096 points

=122.07 kilohertz per point

In process 118 labeled CALCULATE NEAR-END CONNECTOR NEXT ESTIMATE, the normalized cross-talk response represented by NECC is calculated.

NECC=CONN/NORM5

NORM5 is the normalization data for the 5 nanosecond pulse obtained in processes 102 and 106. CONN is the frequency representation of the cross-talk response of the connector 12 which was obtained from the 5 nanosecond pulse response data contained in cut5. By normalizing the response CONN by the stimulus NORM5, the actual cross-talk function NECC of the connector 12 is derived.

In process 120 labeled CALCULATE NEAR-END COMPENSATED NEXT—5 NS, 16 NS, 64 NS, the cross-talk function of the LAN cable system 50 (shown in FIG. 3) is calculated for each of the pulse widths, including 5, 16, and 64 nanoseconds with the cross-talk effects of the connector 12 removed. Because cross-talk is generally recognized as a ratio of response over stimulus, it is appropriate to obtain the magnitude of the ratio and express it in terms of decibels (dB).

$$NEXT5 = 20 \log \left| \frac{CUT5}{NORM5} - NECC \right|$$

$$NEXT16 = 20 \log \left| \frac{CUT16}{NORM16} - NECC \right|$$

$$NEXT64 = 20 \log \left| \frac{CUT64}{NORM64} - NECC \right|$$

Referring now to FIG. 8C, in a process 124 labeled ASSEMBLE COMPOSITE NEXT RESPONSE, a composite cross-talk response of the LAN cable system 50 (shown in FIG. 3) is assembled from portions of NEXT5, NEXT16, and NEXT64. Three pulse widths were employed to maximize the signal energy at various frequency ranges in a manner described more fully below. The composite cross-talk response, COMP_NEXT is assembled using NEXT64 from 0.1 to 10 megahertz, NEXT16 from 10 to 40 megahertz, and NEXT5(m) from 40 megahertz to 150 megahertz. In this way, COMP_NEXT maintains an optimal signal to noise ratio over the entire frequency of interest, 0.1 to 100 megahertz.

In process 126 labeled COMPARE COMPOSITE NEXT RESPONSE TO SPECIFICATION LIMIT, COMP_NEXT is compared with a specification limit line supplied by the Telecommunications Industry Association as the accepted pass-fail limit. A pass-fail decision is then made responsive to the results of the comparison. If any of the points within COMP_NEXT is above its corresponding specification limit, the LAN cable system 50 under test is considered as a "fail". Otherwise, the LAN cable system 50 passes its cross-talk test.

In process 128 labeled COMMUNICATE PASS/FAIL INFORMATION TO USER, the results of the pass/fail decision of the process 126 are communicated to the user via the display 86 (shown in FIG. 7) of the instrument 10. A graphical display of the cross-talk response of the LAN cable system 50 using the data contained in COMP_NEXT may also be shown as well as a simple pass or fail indication.

In process 130 labeled END, the measurement process ends. Under instrument control, the measurement process may automatically return to the START process 100 (shown in FIG. 8A) or an interim measurement process to repeat the measurement continuously.

Figure 9:
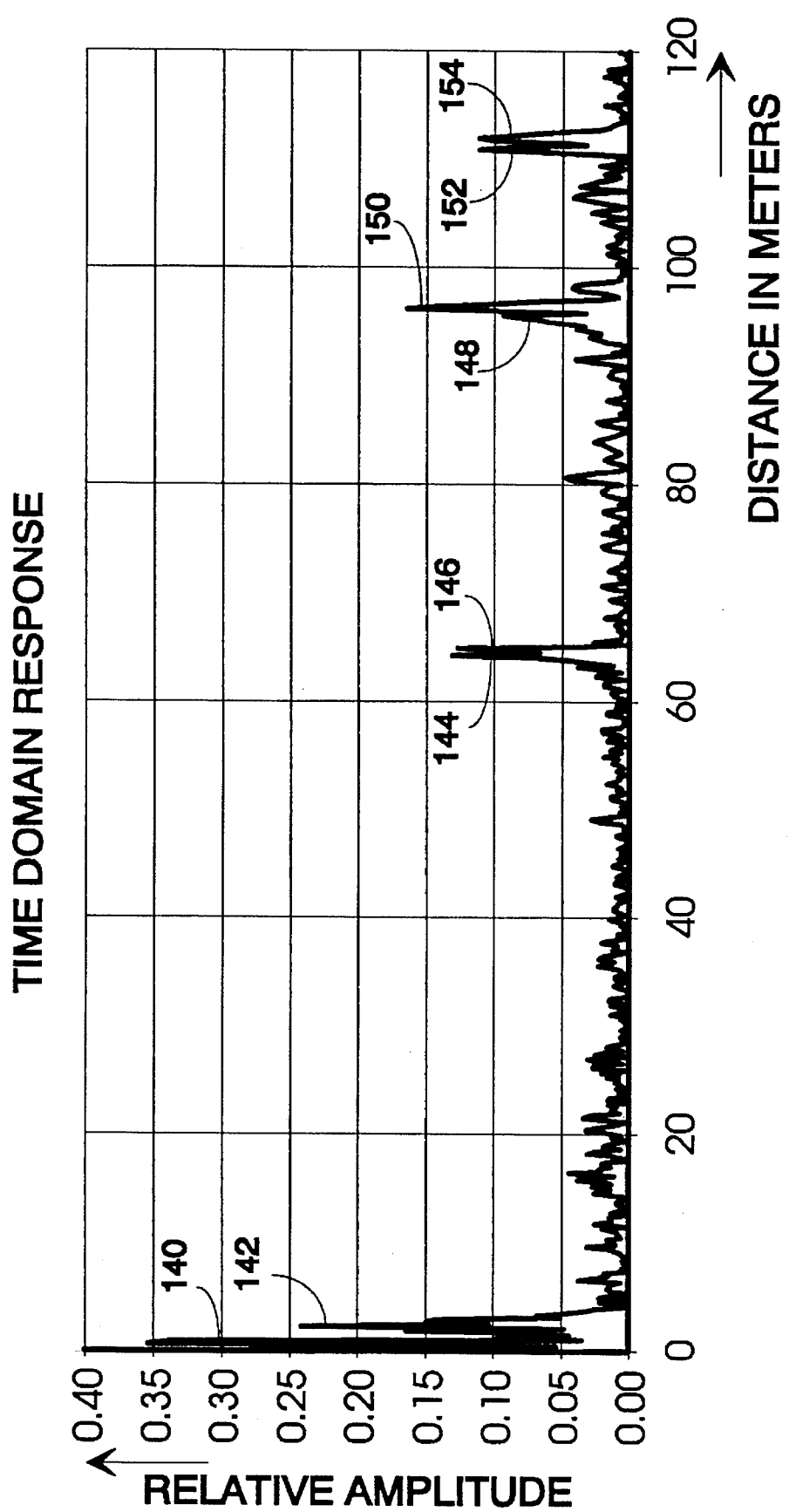
FIG. 9 is a graph illustrating the pulse response of a typical LAN cable system stored as a time record in the LAN cable test instrument.

Referring now to FIG. 9, there is shown a graph illustrating a 5 nanosecond pulse response of a typical LAN cable system 50 (shown in FIG. 3) stored as a time record in the memory 90 (shown in FIG. 7) in the test instrument 10. This graph represents the typical contents of the data files cut5, cut16, and cut64 which may be obtained as described above.

In FIG. 9, the lower trace illustrates the contents of cut5 obtained by measuring the LAN cable system 50 comprising a 2 meter patch cable, a 67 meter cable, a first one meter patch cable, a 33 meter cable, a second one meter patch cable, a 17 meter cable, followed by a third one meter patch cable, and a termination (not shown) provided by the remote unit 32 (shown in FIG. 1). It will be noted that for purposes of clarity, the graph has been drawn showing only the absolute magnitude of the pulse response data and with a weighting factor that enhances the amplitude of the pulse response as the distance increases to compensate for losses in the cable. The peaks of the graph correspond to the LAN cable connectors in the LAN cable system 50 that couple the various links described. Peak 140 corresponds to the near-end connector 12. Peak 142 corresponds to the LAN cable connector 16 (shown in FIG. 3) at the other end of the patch cable 14. Peaks 144 and 146 correspond to LAN cable connectors at either end of the first 1 meter patch cable. Peaks 148 and 150 correspond to LAN cable connectors at either end of the second 1 meter patch cable. Peaks 152 and 154 correspond to LAN cable connectors at either end of the third 1 meter patch cable.

The peak 140 corresponding to the cross-talk of the near-end connector 12 is substantially higher than the other peaks in this instance. As explained above, the cross-talk response of the LAN cable system 50 excludes the response of the near-end connector 12 according to the TIA specification and the present invention provides for its removal. If only the cross-talk response of the LAN cable system 50 using 5 nanosecond width pulses were desired, it would be a simple matter to "zero out" the portion of the cut5 response related to the peak 140 in the time record and thus obtain a valid cross-talk response according to the industry definition. However, 16 nanosecond and 64 nanosecond width pulse measurements are also employed for improved signal to noise ratios at desired frequency ranges, thus requiring normalization and subtraction in the frequency domain as is done in the process 120 (shown in FIG. 8B).

Figure 10:
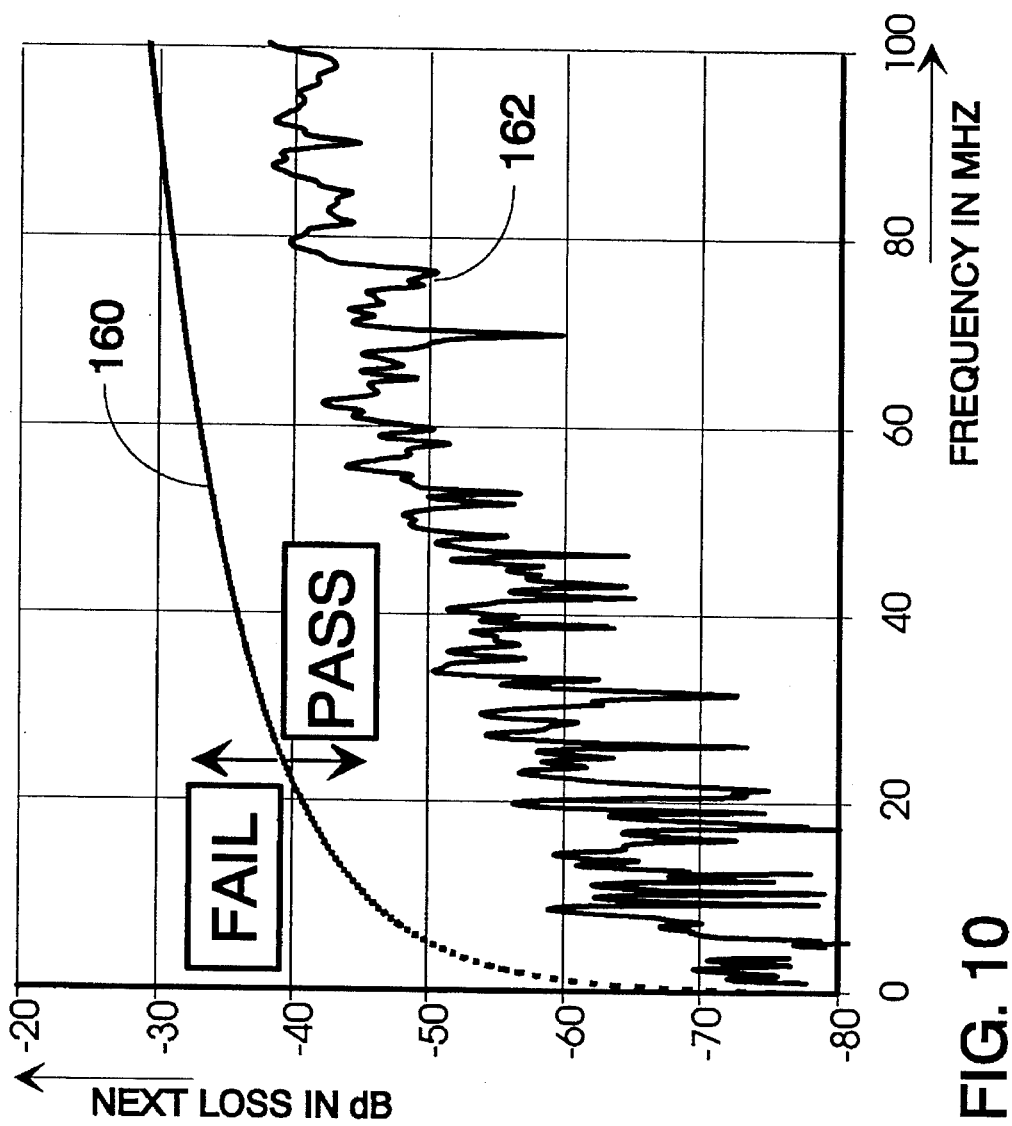
FIG. 10 is a graph illustrating the frequency domain representation of the time record of FIG. 9 as compared with a predetermined pass-fail limit line.

Referring now to FIG. 10, a graph illustrating the composite cross-talk response of the LAN cable system 50 as compared with a predetermined NEXT pass-fail limit line. The vertical scale is the NEXT loss in decibels and the horizontal scale is frequency in megahertz. A more negative NEXT loss is more desirable. Continuing the example from FIG. 9, a representative LAN cable system 50 consists of a 2 meter patch cable, a 67 meter cable, a first one meter patch cable, a 33 meter cable, a second one meter patch cable, a 17 meter cable, followed by a third one meter patch cable, and a termination provided by the remote unit 32 (shown in FIG. 1). The cross-talk response shown in FIG. 10 is a composite of NEXT64 from 0.1 to 10 megahertz, NEXT16 from 10 to 40 megahertz, and NEXT5 from 40 megahertz to 155 megahertz, as is performed in the process 124 (shown in FIG. 8C).

A trace 160 corresponds with the pass-fail limit line. A trace 162 corresponds with the composite cross-talk response of the LAN cable system 50 as calculated. As shown, every point of the trace 162 is below the trace 160. The test instrument 10 would thus return a decision of "pass" according to this cross-talk response in the process 126 in FIG. 8C.

Figure 11:
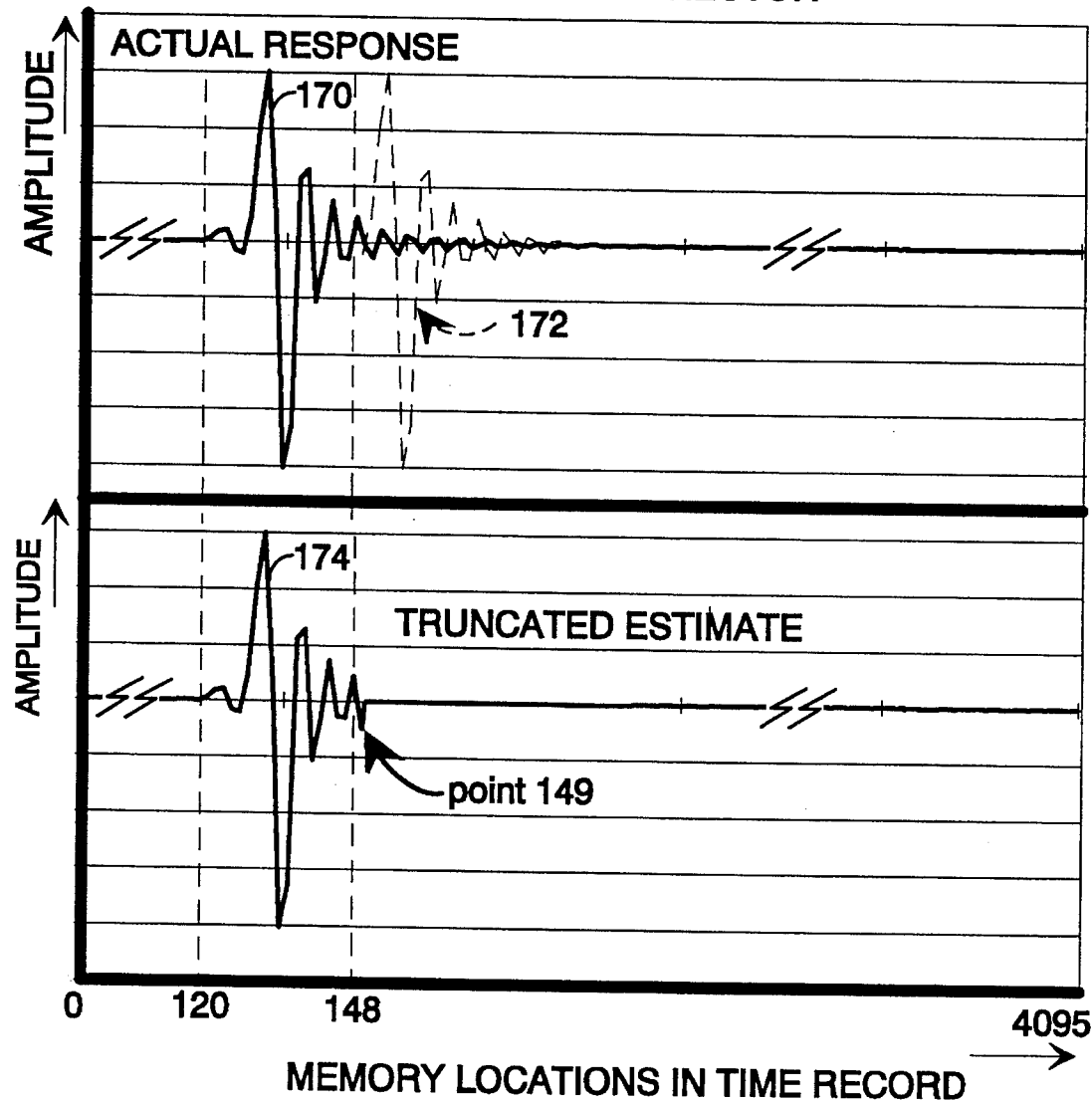
FIG. 11 is a graph illustrating the actual pulse response of a typical near-end connector using points from a predetermined section of the time record and a truncated estimate of the actual pulse response.

Referring now to FIG. 11, there is shown a graph illustrating the actual pulse response of a typical near-end LAN cable connector 12 using points from a predetermined section of the time record and a truncated estimate of the actual pulse response as stored in the time record conn. The vertical axis represents amplitude while the horizontal axis represents memory locations in conn. The pulse response of the near-end connector 12 is measured in the process 112, along with the LAN cable system 50 under test, and the results are stored in the data file cut5. Separating the pulse response of the near-end connector 12 from that of the LAN cable connector 16 at the other end of the patch cable is critical. If the two pulse responses cannot be segregated, the pulse response of the nearend connector 12 cannot be accurately measured and then mathematically subtracted from subsequent pulse response measurements. Trace 170 in the upper portion of the graph shows the actual pulse response of the near-end connector 12 (shown in FIG. 1) with 100 ohm termination resistors substituted for the LAN cable system 50 (shown in FIG. 3). Superimposed on the upper trace is the pulse response of a LAN cable connector 16 which must be separable in order to obtain an accurate cross-talk response measurement of the near-end connector 12.

Ensuring this separation requires that three critical parameters be accounted for and traded off against each other. These parameters include: (a) the minimum length of the patch cable 14 (shown in FIG. 1), (b) the pulse width of the test signal, and (c) the length of the truncated estimate of the actual pulse response of the near-end connector 12.

The length of the patch cable is the first critical parameter to be accounted for. A shorter patch cable decreases the separation between the two pulse responses. A design goal for the test instrument 10 was to have a patch cable 14 that did not require an excessive minimum length. In the present invention, the test instrument 10 must have a patch cable with a minimum length of 2 meters to ensure that the pulse responses of the connectors 12 and 16 are indeed separable.

The 5 nanosecond pulse width, the narrowest pulse width available in the present invention, was chosen to measure the pulse response of the near-end connector 12 because it provides the highest resolution of the three available pulse widths in discerning individual pulse responses in a time record. A narrower pulse produces a narrower pulse response which is more easily separable.

The length of the truncated estimate of the actual pulse response of the near-end connector 12 was chosen to include as much of the near-end connector pulse response as possible, stopping short of point where the pulse response of the connector 16 starts to overlap. The truncated estimate is shown as a trace 174 in the lower portion of the graph. In the preferred embodiment of the present invention, the truncated estimate in the data file conn(m) was chosen from m=120 to 148. All other values except m=149 in the data file are set to 0.

In formulating the truncated estimate in the data file conn, an offset value is inserted at point 149 to force the overall average of the data record to zero.

$$\text{offset} = (-1) * \sum_{m=120}^{148} \text{data}(m)$$

conn(149)=offset conn(1:119)=0 conn(150:4096)=0

The cross-talk response of the near-end connector is based on capacitive coupling, which necessarily has no d.c. value in its pulse response. Thus, forcing the average value to equal ensures that will there be no significant d.c. (direct current) value that occurs in the frequency representation of the truncated time record, contained in the data file CONN, when the fast Fourier transform is performed.

CONN=FFT (conn)

Figure 12:
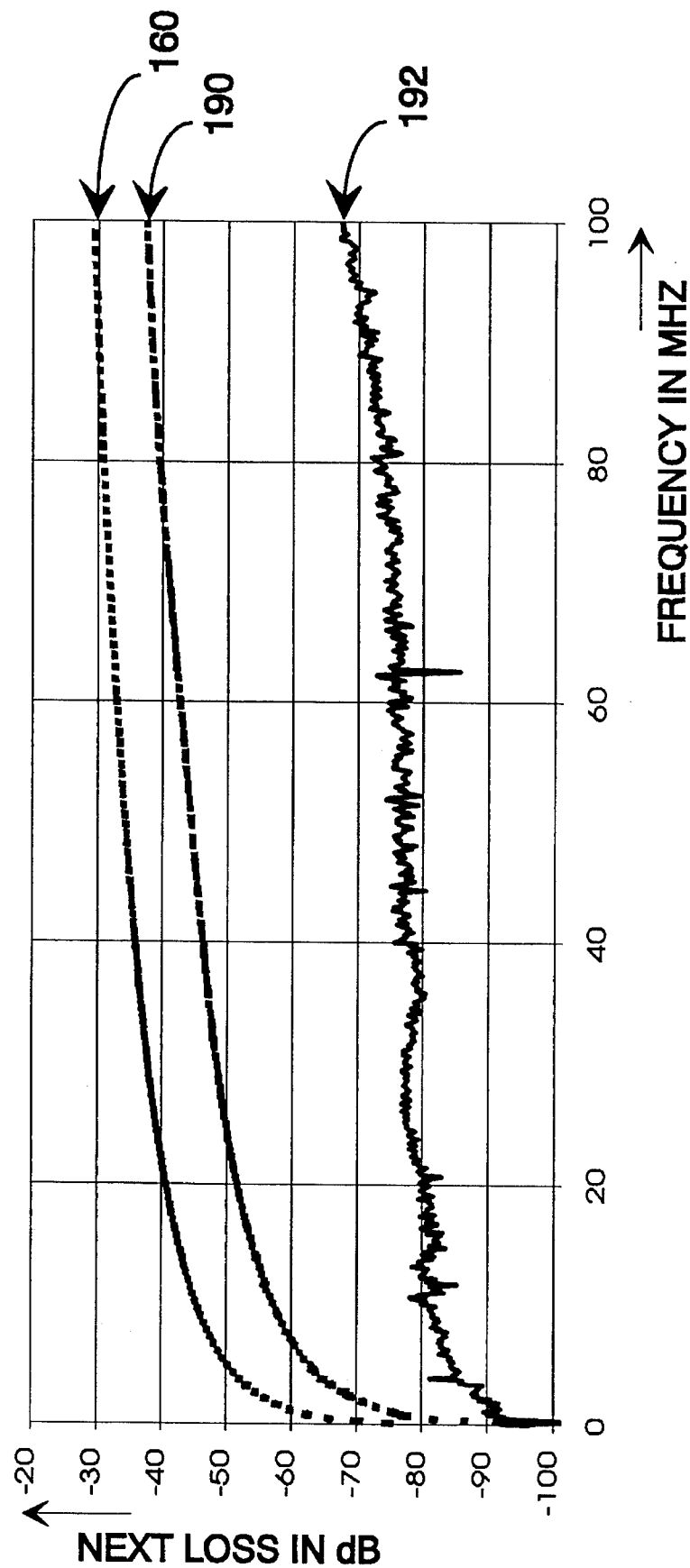
FIG. 12 is a graph illustrating a frequency domain representation of residual cross-talk response comparing the cross-talk effects of the near-end connector on the cross-talk response of the LAN cable system with and without compensation according to the present invention.

Referring now to FIG. 12, there is shown a graph illustrating a frequency domain representation of residual cross-talk response comparing the effects of the near-end connector on the cross-talk response of the LAN cable system with and without compensation for the near-end connector 12 (as shown in FIG. 1) according to the present invention. The vertical axis is cross-talk loss in decibels (dB) and the horizontal axis is frequency in megahertz. Residual cross-talk response is measured with the near-end connector 12 terminated with 100 ohm resistors at each of the wire pairs 42a–d so the pulse response of the near-end connector 12 is the only one present in the time record.

The upper trace 160 is the specification limit of FIG. 10.

A trace 190 shows the residual cross-talk response with no compensation for comparison purposes. In other words, in the process 120 of FIG. 8B, the cross-talk calculation does not subtract the effect of the near-end connector 12 which appears as NECC. Thus, a theoretically perfect LAN cable system 50, with no pulse response, is only 12 dB below the specification limit as shown by the difference between the trace 160 and 190. This relatively small difference, when coupled with a LAN cable system 50 which has a cross-talk response substantially close to the specification limit, results in a high probability that a false pass or fail indication will be given to the user.

A trace 192 shows the residual cross-talk response with compensation according to the present invention. Now, a theoretically perfect LAN cable system 50, with no cross-talk pulse response, would be measured over 30 dB below the specification limit, as shown by the difference between the trace 160 and the trace 190. Adding compensation for the near-end connector 12 thus provides a substantial improvement in measurement accuracy and reduction in errors in returning a false pass or fail indication to the user.

Figure 13:
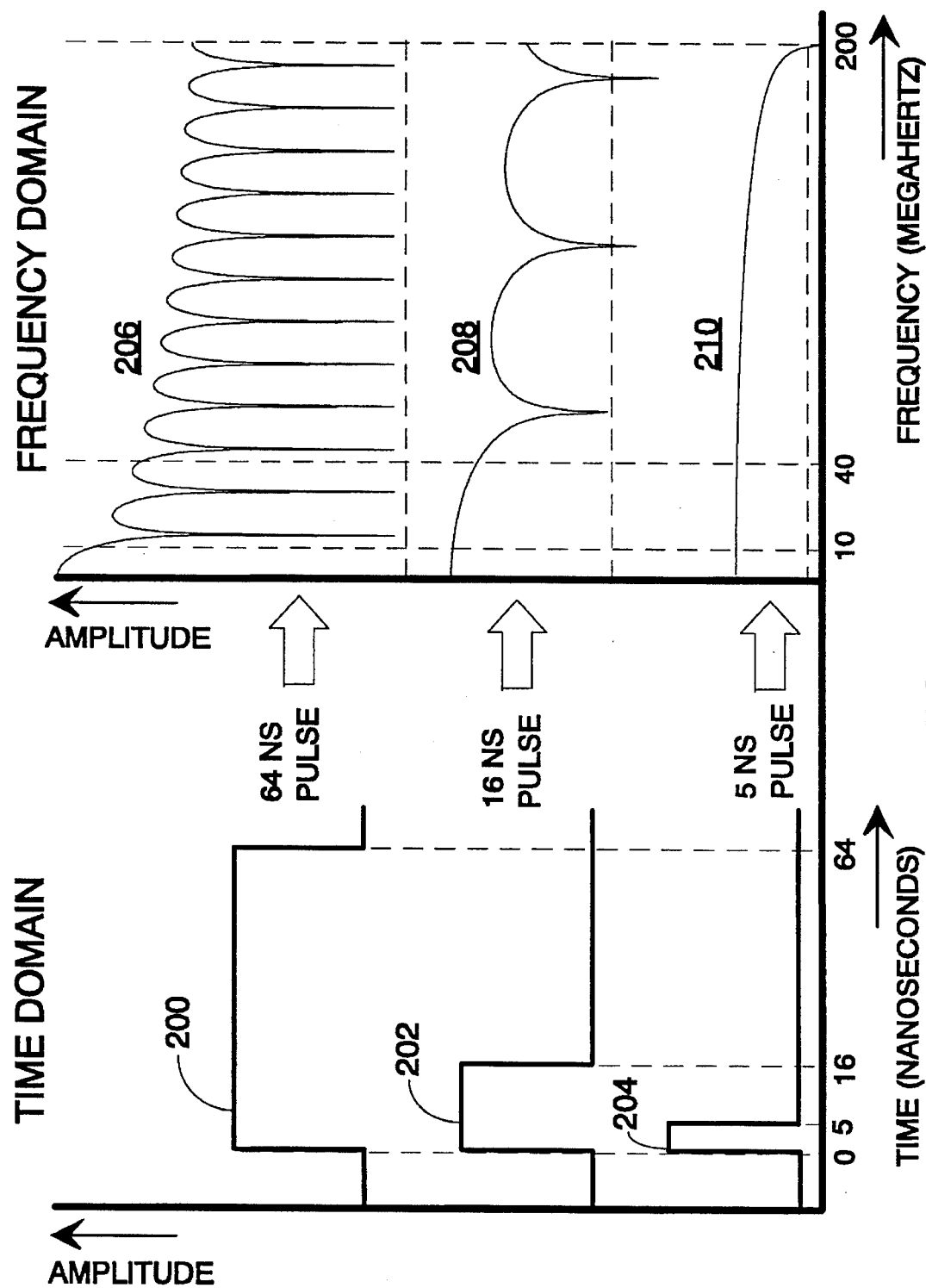
FIG. 13 is a graph illustrating the relationship between pulse width in the time domain and the distribution of pulse energy in the frequency domain.

Referring now to FIG. 13, there is shown a graph illustrating the relationship between pulse width in the time domain and the distribution of pulse energy in the frequency domain. The left portion of the graph is the time domain representation of a 64 nanosecond width square pulse 200, a 16 nanosecond width square pulse 202, and a 5 nanosecond width square pulse 204 which together comprise a set of pulse widths. The vertical axis is relative amplitude and the horizontal axis is pulse width in nanoseconds. The pulses 200, 202, and 204 have the same relative amplitude in the graph. Each of the pulses 200, 202, and 204 have an equivalent frequency domain representation as illustrated on the right portion of the graph. Trace 206 is the frequency domain representation of the 64 nanosecond pulse 200. The trace 206 shows substantial drops in relative energy at 15.625 megahertz intervals which would make measurements near those frequencies unusable. Similarly, trace 208 is the frequency domain representation of the 16 nanosecond pulse 202 which shows substantial drops in relative energy at 62.5 megahertz intervals. Trace 210 is the frequency domain representation of the 5 nanosecond pulse 204 which has its first substantial drop in relative energy at 200 megahertz, which is outside the frequency range of interest in the present invention.

Figure 14:
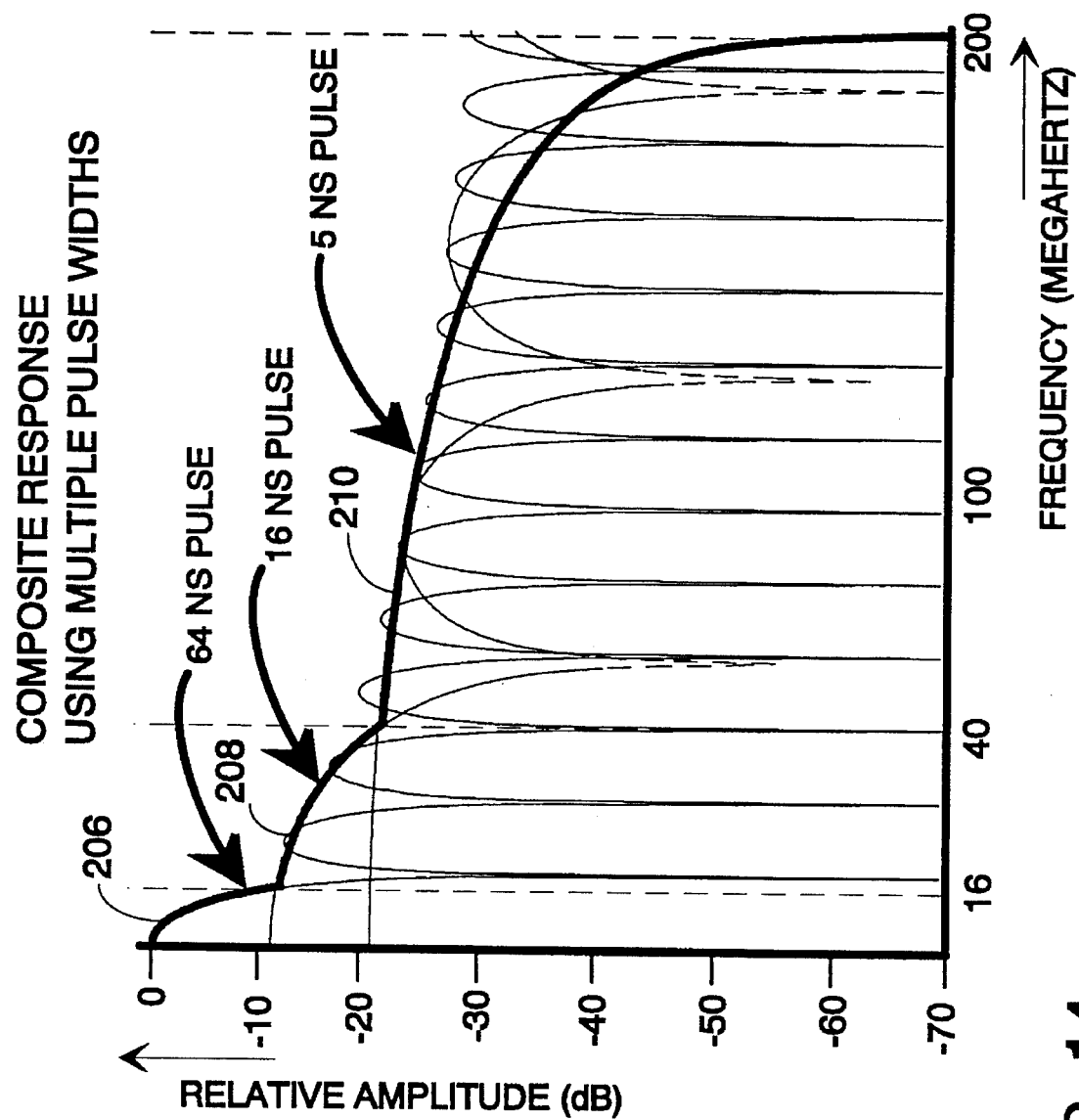
FIG. 14 is a graph illustrating the process of concatenating the frequency representation of the pulse widths shown in FIG. 13 obtain increased pulse energy at selected frequency ranges to obtain improved measurement accuracy according to the present invention.

Referring now to FIG. 14, there is shown a graph illustrating the process of using differing pulse widths to obtain increased pulse energy at selected frequency ranges to obtain improved measurement accuracy according to the present invention. While the traces 206, 208, and 210 (shown in FIG. 13) each have substantial drops in energy at various frequencies, a well-known property called bandwidth-time invariance can be used to take advantage of selected frequency ranges where the relative pulse energy is higher. According to bandwidth-time invariance, narrower pulses spread their energy over a wider frequency spectrum but at a correspondingly lower amplitude. Conversely, wider pulses can be employed to provide extra energy for measurements at lower frequency ranges for improved measurement accuracy.

In the graph, the traces 206, 208, and 210 have been concatenated to form a composite frequency response as shown by the heavy line. This composite response maintains a relative high amount of energy at the low end of the frequency of 0.1 to 10 megahertz where such energy is most needed. At 0.1 megahertz, for example, the relative pulse energy of the 64 nanosecond pulse is 22 dB higher than that of the 5 nanosecond pulse. Between 10 megahertz and 40 megahertz, the 16 nanosecond pulse energy is employed to provide additional pulse energy above that of the 5 nanosecond pulse while avoiding the energy "dropouts" of the 6 nanosecond pulse. Above 40 megahertz, adequate pulse energy is maintained at all other frequencies in the range of interest below 150 megahertz using the 5 nanosecond pulse.

The particular combination of pulse widths chosen in the preferred embodiment of the present invention was chosen to provide an optimal amount of measurement accuracy over the frequency range of interest between 0.1 megahertz to 100 megahertz. Measurement accuracy is most critical for measurements that are in close proximity to the specification limit line. The specification limit line, which appears graphically as the trace 160 in FIG. 10, varies as a function of frequency.

$$\text{limit line} = -27 + 15 * \log_{10}\left(\frac{f}{100}\right)$$

f=frequency in megahertz

At low frequencies, for example 1 megahertz, the limit line is −57 dB, which means that pulse response signal returned for measurement is relatively small. The test instrument has a "noise floor" which is a minimum sensitivity level that is relatively constant over the frequency range. The signal to noise ratio directly governs measurement accuracy. Thus, in order to maintain adequate measurement accuracy at low frequencies where the signal to noise ratio begins to deteriorate, the present invention employs a wider pulse width to provide more signal energy. Conversely, at higher frequencies, narrower pulse widths are employed to obtain adequate bandwidth to cover the frequency range of interest.

It will be obvious to those having ordinary skill in the art that many changes may be made in the details of the above described preferred embodiments of the invention without departing from the spirit of the invention in its broader aspects. For example, the present invention may be employed to remove undesired cross-talk responses from any number of selected locations along a pair of transmission lines, limited by the effects of the intervening transmission line to estimate the undesired pulse responses with sufficient accuracy to effect their removal and sufficient resolution to separate the undesired cross-talk responses from the desired responses. Furthermore, different pulse widths may be employed to obtain increased energy at other frequency ranges of interest. The frequency response of the different pulse widths may be concatenated in any combination desired to obtain a composite response shaped as needed. Therefore, the scope of the present invention should be determined by the following claims.

What I claim as my invention is:

1. In an instrument for measuring a cross-talk response in a pair of transmission lines, a method for removing undesired cross-talk effects from at least one selected location along said pair of transmission lines, comprising:

(a) generating stimulus signals to one of said pair of transmission lines;

(b) receiving cross-talk signals from another of said pair of transmission lines and digitizing said cross-talk signals as a pulse-response time record wherein said cross-talk signals are produced in response to said stimulus signals;

(c) constructing an undesired-response time record from said pulse-response time record containing only said undesired cross-talk effects corresponding to said selected location;

(d) calculating a first frequency domain representation of said pulse-response time record and a second frequency domain representation of said undesired-response time record; and (e) calculating said cross-talk response by subtracting said second frequency domain representation from said first frequency domain representation.

2. A method for removing undesired cross-talk effects according to claim 1, further comprising:

(a) comparing said cross-talk response to a specification limit line;

(b) returning a decision that is one of pass and fail wherein pass is returned if said cross-talk response is less than said specification limit line and fail is returned if said cross-talk response is greater than said specification limit; and (c) communicating said decision to an instrument user.

3. A method for removing undesired cross-talk effects according to claim 1 wherein said selected location comprises a location corresponding to a near-end connector coupled to said instrument.

4. A method for removing undesired cross-talk effects according to claim 1 wherein said stimulus signals comprise a series of square pulses.

5. A method for removing undesired cross-talk effects according to claim 4 wherein said series of square pulses have a pulse width that is one of a set of pulse widths selected to provide pulse energy in a set of frequency ranges.

6. A method for removing undesired cross-talk effects according to claim 5 wherein said set of pulse widths comprises 5 nanosecond, 16 nanosecond, and 64 nanosecond pulse widths.

7. A method for removing undesired cross-talk effects according to claim 5 further comprising:

(a) digitizing said cross-talk signals as a set of time records wherein each time record corresponds with one of said set of pulse widths;

(b) calculating a set of cross-talk responses corresponding to each of said set of said time records; and (c) concatenating portions of said cross-talk responses corresponding with said selected frequency ranges to construct said first frequency domain representation.

8. A method for removing undesired cross-talk effects according to claim 1 wherein said first and second frequency domain representations are calculated using a discrete Fourier transform.

9. In an instrument for measuring a cross-talk response in a local area network cable, a method for removing cross-talk effects of a near-end connector, comprising:

(a) generating stimulus signals to a first selected wire pair within said near-end connector;

(b) receiving cross-talk signals from a second selected wire pair within said near-end connector and digitizing said cross-talk signals as a pulse-response time record wherein said cross-talk signals are produced in response to said stimulus signals;

(c) constructing an undesired-response time record from said pulse-response time record containing only said cross-talk effects of said near-end connector;

(d) calculating a first frequency domain representation of said pulse-response time record and a second frequency domain representation of said undesired-response time record; and (e) calculating said cross talk response by subtracting said second frequency representation from said first frequency representation.

10. A method for removing undesired cross-talk effects according to claim 9, further comprising:

(a) comparing said cross-talk response to a specification limit line;

(b) returning a decision that is one of pass and fail wherein pass is returned if said cross-talk response is less than said specification limit line and fail is returned if said cross-talk response is greater than said specification limit; and (c) communicating said decision to an instrument user.

11. A method for removing undesired cross-talk effects according to claim 9 wherein said stimulus signals comprise a series of square pulses.

12. A method for removing undesired cross-talk effects according to claim 11 wherein said series of square pulses have a pulse width that is one of a set of pulse widths selected to provide pulse energy in a set of frequency ranges.

13. A method for removing undesired cross-talk effects according to claim 12 wherein said set of pulse widths comprises 5 nanosecond, 16 nanosecond, and 64 nanosecond pulse widths.

14. A method for removing undesired cross-talk effects according to claim 12 further comprising (a) digitizing said cross-talk signals as a set of time records wherein each time record corresponds with one of said set of pulse widths;

(b) calculating a set of cross-talk responses corresponding to each of said set of said time records; and (c) concatenating portions of said cross-talk responses corresponding with said selected frequency ranges to construct said first frequency domain representation.

15. A method for removing undesired cross-talk effects according to claim 9 wherein said first and second frequency domain representations are calculated using a discrete Fourier transform.

16. In a pulse-based instrument for measuring a cross-talk response, a method for increasing signal energy at a set of selected frequency ranges, comprising:

(a) generating a series of stimulus pulses to a first transmission line within local area network cable according to a set of pulse widths wherein each of said pulse widths is selected to provide a desired amount of pulse energy at said corresponding frequency ranges;

(b) receiving cross-talk signals from a second transmission line within said local area network cable and digitizing said cross-talk signals as a set of time records wherein each time record corresponds with a predetermined pulse width and said cross-talk signals are produced in response to said stimulus pulses;

(c) calculating a set of cross-talk responses corresponding to each of said set of said time records; and (d) concatenating portions of said cross-talk responses corresponding with said selected frequency ranges to construct said cross-talk response between said first and second transmission fines.

17. A method for removing undesired cross-talk effects according to claim 16 wherein said stimulus signals comprise a series of square pulses.

18. A method for removing undesired cross-talk effects according to claim 17 wherein said series of square pulses have a pulse width that is one of a set of pulse widths selected to provide pulse energy in a set of frequency ranges.

19. A method for removing undesired cross-talk effects according to claim 18 wherein said set of pulse widths comprises 5 nanosecond, 16 nanosecond, and 64 nanosecond pulse widths.

20. An instrument for measuring a cross-talk response in a pair of transmission lines in a local area network cable while removing undesired cross-talk effects from at least one selected location along said pair of transmission lines, comprising:

(a) a near-end connector coupled to said pair of transmission lines;

(b) a pulse generator for generating stimulus pulses in one of said pair of transmission lines;

(c) a digitizer coupled to said near-end connector for receiving cross-talk signals from another of said pair of transmission lines and producing a pulse-response time record of said cross-talk signals wherein said cross-talk signals are produced in response to said stimulus pulses; and (d) a microprocessor coupled to said digitizer for receiving said time record, wherein said microprocessor calculates a cross-talk response of said time record, and mathematically removes said undesired cross-talk effects from said cross-talk response.

21. An instrument according to claim 20 wherein said stimulus pulses comprise a plurality of pulse widths chosen to provide sufficient energy in a set of frequency ranges that correspond with said plurality of pulse widths.

22. An instrument according to claim 21 wherein said plurality of pulse widths comprises 5 nanosecond, 16 nanosecond, and 64 nanosecond pulse widths.

23. An instrument according to claim 21 wherein said microprocessor further receives a set of time records wherein each time record corresponds with one of said set of pulse widths, calculates a set of cross-talk responses corresponding to each of said set of said time records and concatenates portions of said cross-talk responses corresponding with said selected frequency ranges to construct said cross-talk response.

24. An pulse-based instrument for measuring a cross-talk response in a pair of transmission lines in a local area network cable, comprising:

(a) a near-end connector coupled to said pair of transmission lines;

(b) a pulse generator coupled to said near-end connector for generating stimulus pulses in one of said pair of transmission lines wherein said stimulus pulses comprise a plurality of pulse widths chosen to provide sufficient energy in a set of frequency ranges that correspond with said plurality of pulse widths;

(c) a digitizer coupled to said near-end connector for receiving cross-talk signals from another of said pair of transmission lines, and producing a pulse-response time record of said cross-talk signals for each pulse width wherein said cross-talk signals are produced in response to said stimulus pulses; and (d) a microprocessor coupled to said pulse generator for selecting said pulse widths and to said digitizer for receiving said pulse-response time records, wherein said microprocessor calculates a cross-talk response of each of said time records, mathematically removes the undesired cross-talk effects of said near-end connector, and constructs said cross-talk response by concatenating selected portions of each frequency representation that corresponds with each of said sets of pulse widths and frequency ranges.

25. An instrument according to claim 24 wherein said plurality of pulse widths comprises 5 nanosecond, 16 nanosecond, and 64 nanosecond pulse widths.

* * * * *